(12) United States Patent
Schultz et al.

(10) Patent No.: US 8,020,780 B2
(45) Date of Patent: Sep. 20, 2011

(54) THERMOSTATIC CONTROL SYSTEM HAVING A CONFIGURABLE LOCK

(75) Inventors: David A. Schultz, Savage, MN (US); Cary Leen, Hammond, WI (US); Heidi J. Finch, Champlin, MN (US)

(73) Assignee: Honeywell International Inc., Morristown, NJ (US)

( * ) Notice: Subject to any disclaimer, the term of this patent is extended or adjusted under 35 U.S.C. 154(b) by 773 days.

(21) Appl. No.: 11/948,987

(22) Filed: Nov. 30, 2007

(65) Prior Publication Data

US 2009/0140061 A1 Jun. 4, 2009

(51) Int. Cl.
G05D 23/00 (2006.01)

(52) U.S. Cl. .......... 236/51; 340/5.31; 340/5.32; 726/34

(58) Field of Classification Search ............... 236/51; 726/34, 35, 36, 21; 340/5.31, 5.32, 5.33, 340/825.69, 825.72, 5.61, 5.62, 3.1, 3.71
See application file for complete search history.

(56) References Cited

U.S. PATENT DOCUMENTS

| | | | | |
|---|---|---|---|---|
| 4,060,123 A * | 11/1977 | Hoffman et al. | ............ | 165/11.1 |
| 5,272,477 A * | 12/1993 | Tashima et al. | ......... | 340/870.16 |
| 5,419,489 A * | 5/1995 | Burd | .............................. | 236/47 |
| 5,590,831 A * | 1/1997 | Manson et al. | ................. | 236/51 |
| 5,595,342 A * | 1/1997 | McNair et al. | .................. | 236/51 |
| 5,600,299 A * | 2/1997 | Tompkins | .................... | 340/429 |
| 5,905,442 A * | 5/1999 | Mosebrook et al. | .......... | 340/3.7 |
| 6,128,770 A * | 10/2000 | Agrawal et al. | ................. | 716/17 |
| 6,321,381 B1 * | 11/2001 | Yuen et al. | ..................... | 725/28 |
| 6,513,723 B1 * | 2/2003 | Mueller et al. | .............. | 236/46 R |
| 6,644,557 B1 * | 11/2003 | Jacobs | ........................ | 236/46 R |
| 6,690,290 B2 * | 2/2004 | Young et al. | ............. | 340/825.69 |
| 6,776,350 B2 * | 8/2004 | Sumida et al. | ................... | 236/51 |
| 6,851,621 B1 * | 2/2005 | Wacker et al. | .................. | 236/51 |
| 6,985,137 B2 * | 1/2006 | Kaikuranta | .................... | 345/175 |
| 7,076,268 B2 * | 7/2006 | Blacklock et al. | ......... | 455/550.1 |
| 7,134,015 B2 * | 11/2006 | Kulack et al. | .................. | 713/166 |
| 7,231,231 B2 | 6/2007 | Kokko et al. | | |
| 7,434,742 B2 * | 10/2008 | Mueller et al. | .............. | 236/46 C |
| 7,469,550 B2 * | 12/2008 | Chapman et al. | ............... | 62/157 |
| 2003/0034898 A1 * | 2/2003 | Shamoon et al. | ........ | 340/825.72 |
| 2003/0213851 A1 * | 11/2003 | Burd et al. | .................. | 236/44 A |
| 2004/0085351 A1 | 5/2004 | Tokkonen | | |
| 2004/0107717 A1 * | 6/2004 | Yoon et al. | ...................... | 62/230 |
| 2004/0220931 A1 * | 11/2004 | Guthridge et al. | ................ | 707/8 |
| 2005/0049003 A1 * | 3/2005 | Lail et al. | ...................... | 455/557 |
| 2005/0116840 A1 | 6/2005 | Simelius | | |

(Continued)

FOREIGN PATENT DOCUMENTS

JP 2007074185 A * 3/2007

*Primary Examiner* — George Nguyen

(74) *Attorney, Agent, or Firm* — Seager, Tufte & Wickhem LLC

(57) ABSTRACT

A thermostatic control system having a configurable lock mechanism. The mechanism may be for preventing unauthorized or unintended operation of the thermostatic control system. The system may have a manual or an automatic lock out. If the manual or automatic lock out is not effected, the system may be configured to automatically effect a lock out after a certain period of time. To remove the lock out may require a coded entry. The lock out may be full or partial with respect to the functionality of the system. The lock out mechanism may be applicable to a wireless remote control of a thermostatic system; however, it may also be applicable, for instance, to a wall module thermostat.

19 Claims, 23 Drawing Sheets

U.S. PATENT DOCUMENTS

| | | |
|---|---|---|
| 2005/0253817 A1 | 11/2005 | Rytivaara et al. |
| 2006/0012577 A1 | 1/2006 | Kyrola |
| 2006/0046694 A1 | 3/2006 | Yu |
| 2006/0055554 A1* | 3/2006 | Hayes et al. .............. 340/825.22 |
| 2006/0103545 A1* | 5/2006 | Tsou ........................ 340/825.69 |
| 2006/0117197 A1 | 6/2006 | Nurmi |
| 2006/0170533 A1* | 8/2006 | Chioiu et al. ................ 340/5.61 |
| 2006/0283965 A1* | 12/2006 | Mueller et al. ................... 236/51 |
| 2007/0042804 A1* | 2/2007 | Ryley et al. ................. 455/556.1 |
| 2009/0140061 A1* | 6/2009 | Schultz et al. ................... 236/51 |

* cited by examiner

THERMOSTATIC CONTROL SYSTEM HAVING A CONFIGURABLE LOCK

BACKGROUND

The present invention pertains to thermostats and particularly to control devices. More particularly, the invention pertains to locking mechanisms relative to such devices.

SUMMARY

The invention is a thermostatic control system having a configurable lock mechanism.

DESCRIPTION

Figure 1:
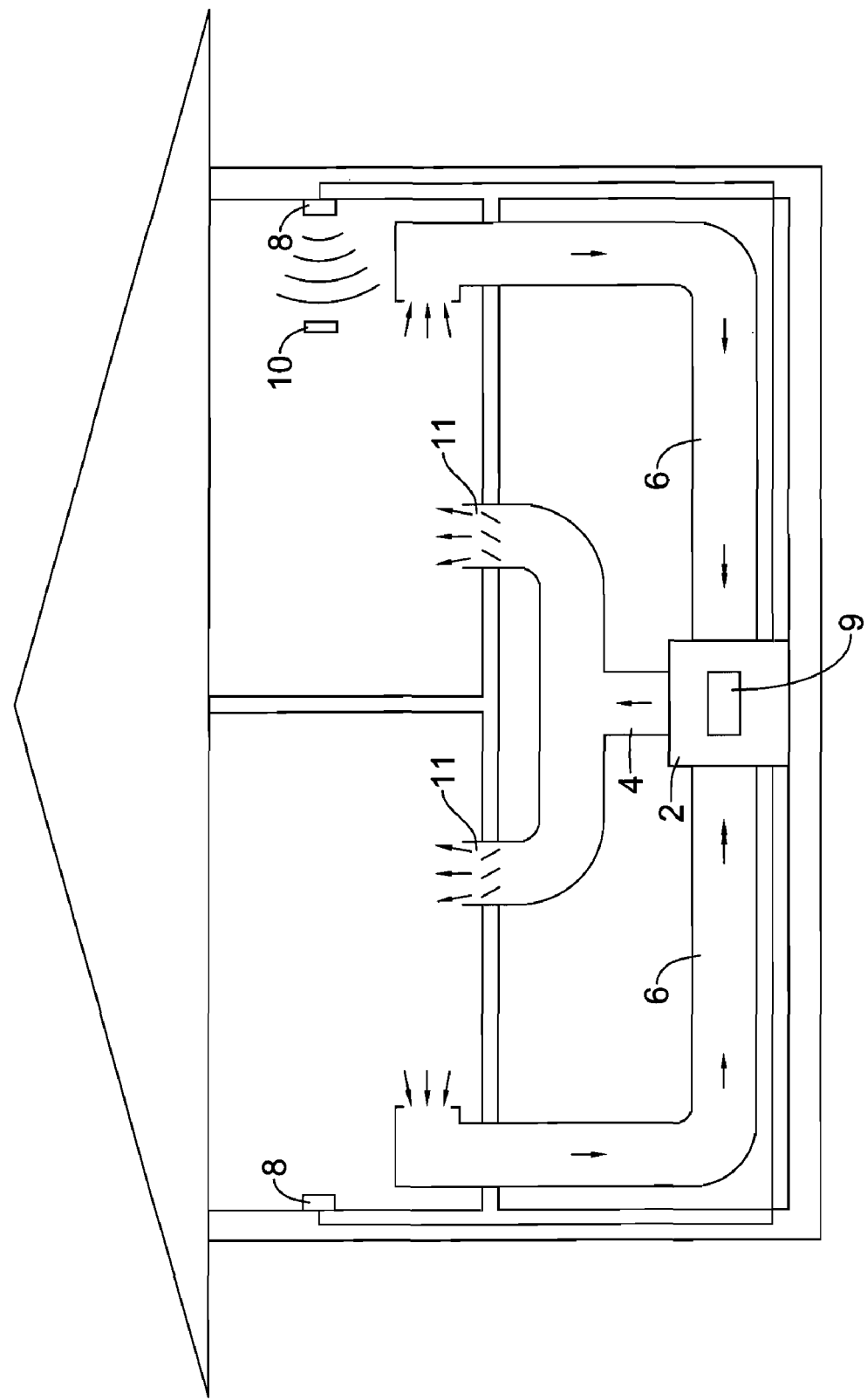
FIG. 1 is a diagram of a building or other structure with an illustrative heating, ventilation, and air conditioning (HVAC) system.

The present invention is to provide, among other things, the home owner of one or more the devices having an approach to stop unauthorized or unwarranted operation of the device. The protection approach should limit key operation for commercial installation, stop the various people such as children from randomly pressing keys, and stop stuck key operation, for instance, when a remote device becomes stuck between the cushions of a couch.

If the device is configured for manual lock, the user is required to put the device in key lockout mode when interaction with the device is complete.

If the device is configured for automatic key lockout, the device may go into key-lock after a configurable timeout. This would permit the owner of the control device to stop unauthorized or unwarranted operation of the device in the event that a manual lock out was not implemented.

One may add a configuration to the device to permit the user to select the timeout, where the device would timeout and go into key-lock state. The user may be required to inactivate the key-lock state before operating the remote control device. This may be done by a multi-key press arrangement or a coded entry approach.

The present key-lock feature may be used to protect the equipment and the controlled environment that the remote control is connected to. Having the ability to configure the remote for either automatic or manual lock out is particularly helpful in an HVAC setting. If the remote control inadvertently had its heat settings moved high in the summer time just as one was leaving the building, and the resulting situation was not discovered until after a certain absence from the building, then certain hazardous conditions could arise.

The device of interest herein may be referred to as a portable remote user interface (PRUI or RUI), remote control or controller, or a remote or control. The device may have one or more sensors and control settings within it along with other functionalities of a thermostat. The remote control may provide temperature control at the place where the control is located. So if some one went outside of a Minnesota building with the remote control in the winter time, then the heat may come on stronger than it should. The remote control may be the thermostat of significance if the wall module thermostat is not typically used for sensing temperature in a space under environmental conditions of an HVAC or building automation system. If the remote is relied on rather exclusively, then the wall module may be placed in an out-of-the way location, such as in a closet, for example, if the aesthetics of a wall module situated in the temperature controlled space are not desirable.

The remote control unit may have a lock-out to prevent accidental changes or erroneous entries or settings to the unit. The lock-out may be total or partial. It may be partial for some functions, but not for others, being locked out. The unit may indicate that it is locked out by some way such as a light or graphical display notice. The lock out may be engaged by holding a lock out designated button, a touch on a screen, or other action, for a period of time, or the device may automatically lock out after a certain period of time after activity with the device has ceased. There may be an unlock button or other mechanism at the remote control unit or the thermostat module which has to be held for a certain period of time to unlock the device for uncoded entry to the device. In some designs, the remote device or thermostat module might need a code or password to unlock. There may be only one remote user interface device per home, or there could be multiple remote user interface devices in the same home or building. Each could be designed to control the temperature in a certain zone having its own thermostat which the remote could override in terms temperature sensing and control. Or an extra remote control may be redundant or a substitute. If the remotes were each unique to one thermostat, then a remote could be transferable from one thermostat to another with controls and sensors on the remote control affecting the designated thermostat. Or one remote could control several thermostats individually or collectively by inputting the respective designations on the remote control. If a remote control is lost or its unlock code is unknown, one could resort to a backup remote control. However, if it is the only remote control relative to a certain thermostat and it is lost, one may go to the respective thermostat to make the lost remote to beep. If there are multiple remotes, a designated remote may be made to beep from the thermostat or possible from other remotes tied in to the same thermostat or common network of thermostats and zones in the facility.

The remote control may be set up with a manual lock, or an automatic lock after a certain period of time. Manual, auto or both locks may be selected. A thermostat may be set up with similar configurable locking approaches as a remote control.

The locking features of the remote control may be user configurable. The amount of time, for instance, before an auto lock occurs from the last moment of legitimate activity with the remote may be set. An unlocking may require a password that could be programmed into the remote. If the password is lost or forgotten, or the person who entered the password is unavailable, one might go to the owner's manual for a procedure to recover the password or to unlock the remote without the password, such as one leading to an overriding reset of the remote to an unlocked condition. In some systems, one may go to the thermostat to override the remote control. In a remote control with a graphical display, there may be a message apart from the remote so that the user can see what happens when a button is pressed.

The remote control not only may sense temperature and other space-related parameters, but can change set points of temperature and the other parameters. The remote may be configured by a user to have full thermostat capability. The remote control may have limited configurability resulting in only being able to achieve partial thermostat capability.

Since a significant reason for lock-out of the remote is to protect against inadvertent operation of the remote; its long term reliability may be a factor. Thus, the present remote should have at least a year-long power source, without need of external power assist or charge.

FIG. 1 is a schematic view of a building or other structure having an illustrative heating, ventilation, and air conditioning (HVAC) system. While FIG. 1 shows a typical force air type HVAC system, other types of HVAC systems may be used including hydronic systems, boiler systems, radiant heating systems, electric heating systems, or any other suitable type of HVAC system, as desired. The HVAC system of FIG. 1 includes one or more HVAC components 2, a system of vents or ductwork 4 and 6, and one or more HVAC controllers 8. The one or more HVAC components 2 may include, but are not limited to, a furnace, a boiler, a heat pump, an electric heating unit, an air conditioning unit, a humidifier, a dehumidifier, an air exchanger, an air cleaner, and/or the like.

In the illustrative HVAC system shown in FIG. 1, the one or more HVAC components 2 can provide heated air (and/or cooled air) via the ductwork throughout the building or other structure. As illustrated, the one or more HVAC components 2 may be in fluid communication with every room and/or zone in the building or other structure via the ductwork 4 and 6. In operation, when a heat call signal is provided by one or more of the HVAC controllers 8, one or more HVAC components 2 (e.g., forced warm air furnace) may be activated to supply heated air to one or more rooms and/or zones within the building or other structure via supply air ducts 4. The heated air may be forced through supply air duct 4 by a blower or fan 9. In this example, the cooler air from each zone may be returned to the one or more HVAC components 2 (e.g., forced warm air furnace) for heating via return air ducts 6. Similarly, when a cool call signal is provided by one or more of the HVAC controllers 8, the one or more HVAC components 2 (e.g., air conditioning unit) may be activated to supply cooled air to one or more rooms and/or zones within the building or other structure via supply air ducts 4. The cooled air may be forced through supply air duct 4 by the blower or fan 9. In this example, the warmer air from each zone may be returned to the one or more HVAC components 2 (e.g., air conditioning unit) for cooling via return air ducts 6.

In some cases, the system of vents or ductwork 4 and 6 can include one or more dampers 11 to regulate the flow of air. For example, one or more dampers 11 may be coupled to one or more of the HVAC controllers 8 and can be coordinated with the operation of one or more HVAC components 2. The one or more HVAC controllers 8 may actuate dampers 11 to an open position, a closed position, and/or a partially open position to modulate the flow of air from the one or more HVAC components 2 to an appropriate room and/or zone in the building or other structure. The dampers 11 may be particularly useful in zoned HVAC systems, and may be used to control which zone(s) receives conditioned air from the HVAC components 2.

It is contemplated that the one or more HVAC controllers 8 may be configured to control the comfort level of the building or structure by activating and deactivating the one or more HVAC components 2. In some cases, the one or more HVAC controllers 8 may be thermostats, such as, for example, wall mountable thermostat, but this is not required in all embodiments. In some embodiments, the HVAC controllers 8 may be zone controllers, each controlling the comfort level within a particular zone in the building or other structure.

As shown in FIG. 1, an HVAC remote controller 10 may also be provided. In some cases, the HVAC remote controller 10 may be operatively connected in any suitable manner to one or more of the HVAC controllers 8 (e.g. one or more HVAC thermostats and/or one or more HVAC zone controllers) to provide remote temperature sensing and/or parameter setting control for the one or more HVAC controllers 8. In some cases, the HVAC remote controller 10 may be wirelessly connected to one or more of the HVAC controllers 8. The HVAC remote controller 10 may be a portable remote control unit that may allow a user to view, display and/or change one or more parameters of the corresponding HVAC controllers 8 and/or HVAC remote controller 10. The HVAC remote controller 10 may be movable by the user between multiple locations within the building or other structure. For example, in a residential building, the HVAC remote controller 10 may be movable between a living room, a kitchen, a den, a bedroom, and/or any other location in the building. When provided with a temperature sensor, the HVAC remote controller 10 may sense an ambient temperature proximate to the HVAC remote controller 10 and, in some cases, relay the temperature to an appropriate HVAC controller 8. In some cases, the appropriate HVAC controller 8 may use the temperature sensed by the HVAC remote controller 10 to control the comfort level of the building or structure by issuing appropriate commands to the HVAC equipment 2.

In a zoned HVAC system, there may be more than one HVAC controller 8 (or zone controllers), each controlling a corresponding zone within the building or other structure. When so provided, it is contemplated that the HVAC remote controller 10 may be operatively coupled to each of the HVAC controllers 8, either simultaneously, sequentially or by user selection. In some cases, the HVAC remote controller 10 may be configured to automatically or manually detect the number of zoned HVAC controllers 8 in the zoned HVAC system. For example, the HVAC remote controller 10 may be configured to automatically detect and establish communication with each of the zoned HVAC controllers 8, either simultaneously, sequentially or by user selection. Once connected, the HVAC remote controller 10 may be used to provide remote temperature sensing and/or parameter or setting control for the corresponding zoned HVAC controller 8. In some cases, the HVAC remote controller 10 may dynamically change its behavior based on whether it detects a non-zoned or a zone system. For example, when a zoned system is detected, the HVAC remote controller 10 may automatically provide a selection mechanism on the user interface of the HVAC remote controller 10 that allows a user to select, display and/or control parameters and/or settings of an HVAC controller 8 that corresponds to a selected zone in the building or other structure. When a non-zoned system is detected, the zone selection mechanism may not be provided on the display.

Rather than establishing communication with the HVAC controllers 8, and then have the HVAC controllers 8 issue commands or calls to the HVAC components 2, it is contemplated that the HVAC remote controller 10 may issue commands or calls directly to the HVAC components 2, typically across a wireless interface.

Figure 1A:
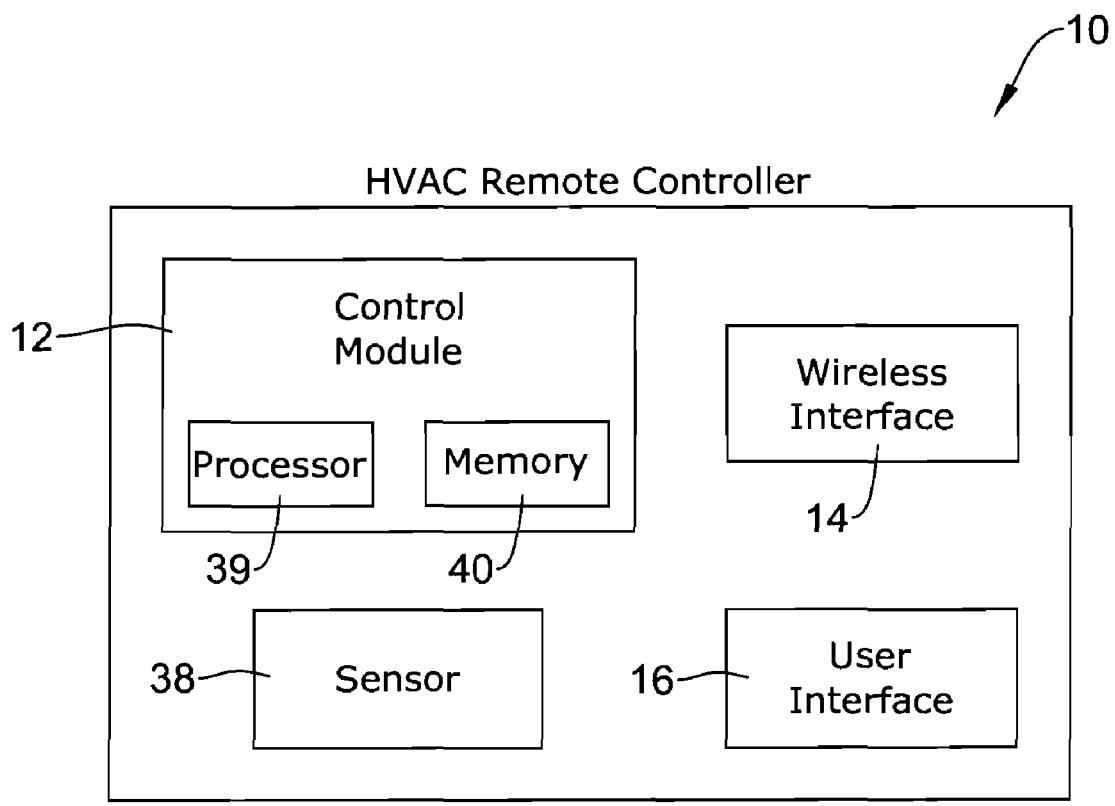
FIG. 1a is a block diagram of an illustrative remote controller that may be used in conjunction with an HVAC system.

FIG. 1A is a block diagram of an illustrative HVAC remote controller 10 that may be used in conjunction with the HVAC system of FIG. 1. In the illustrative example, the HVAC remote controller 10 includes a control module 12, a wireless interface 14, a user interface 16, and a temperature sensor 38. The temperature sensor 38 may be provided to sense the temperature proximate the HVAC remote controller 10. As illustrated, the temperature sensor 38 may be included with the HVAC remote controller 10, such as within a housing (shown in FIG. 2) of HVAC remote controller 10. However, it is contemplated that temperature sensor 38 may be located remote from the HVAC controller 10, but in communication therewith, if desired.

Control module 12 of HVAC remote controller 10 may be configured to help control the comfort level of at least a portion of the building or structure by controlling whether one or more HVAC components 2 of HVAC equipment are activated. In some instances, control module 12 may include a processor 39 and a memory 40. Control module 12 may be configured to control and/or set one or more HVAC functions, such as, for example, HVAC schedules, temperature setpoints, humidity setpoints, trend logs, timers, environment sensing, and/or other HVAC functions, as desired. In the illustrative embodiment, control module 12 may help control the comfort level of at least a portion of the building or structure using the temperature sensed by temperature sensor 38, when provided.

Memory 40 may be used to store any desired information, such as the aforementioned HVAC schedules, temperature setpoints, humidity setpoints, trend logs, timers, environmental settings, and any other settings and/or information as desired. Control module 12 may store information within memory 40 and may subsequently retrieve the stored information. Memory 40 may include any suitable type of memory, such as, for example, random-access memory (RAM), read-only member (ROM), electrically erasable programmable read-only memory (EEPROM), Flash memory, or any other suitable memory, as desired.

Wireless interface 14 of the HVAC remote controller 10 may be configured to wirelessly communicate (i.e., transmit and/or receive signals) with a wireless interface of one or more HVAC controllers 8 (and/or HVAC components 2). For example, wireless interface 14 may be configured to communicate with a wireless interface of HVAC controllers 8 (see FIG. 1) to send and/or receive signals that corresponding to, for example, a temperature sensed by temperature sensor 38, heat and/or cool set points, ventilation settings, indoor and/or outdoor air temperatures, equipment status, scheduling, trend logs, and/or any other suitable information and/or data. It is contemplated that the wireless interface 14 may include, for example, a radio frequency (RF) wireless interface, an infrared wireless interface, a microwave wireless interface, an optical interface, and/or any other suitable wireless interface, as desired.

User interface 14 may be any suitable interface that is configured to display and/or solicit information as well as permit a user to enter data and/or other settings, as desired. In some cases, user interface 16 of the HVAC remote controller 10 may allow a user or technician to program and/or modify one or more control parameters of HVAC remote controller 10, such as programming, set point, time, equipment status and/or parameters, as desired. Alternatively, or in addition, user interface 16 may allow a user or technician to program and/or modify one or more control parameters of the HVAC controller 8. In some instances, the user interface 16 may include a touch screen, non-touch screen, a liquid crystal display (LCD) panel and keypad, a dot matrix display, a computer, buttons and/or any other suitable interface, as desired. In one illustrative example, at least some of the parameters and/or settings may be transmitted to a HVAC controller 8 via wireless interface 14.

Figure 1B:
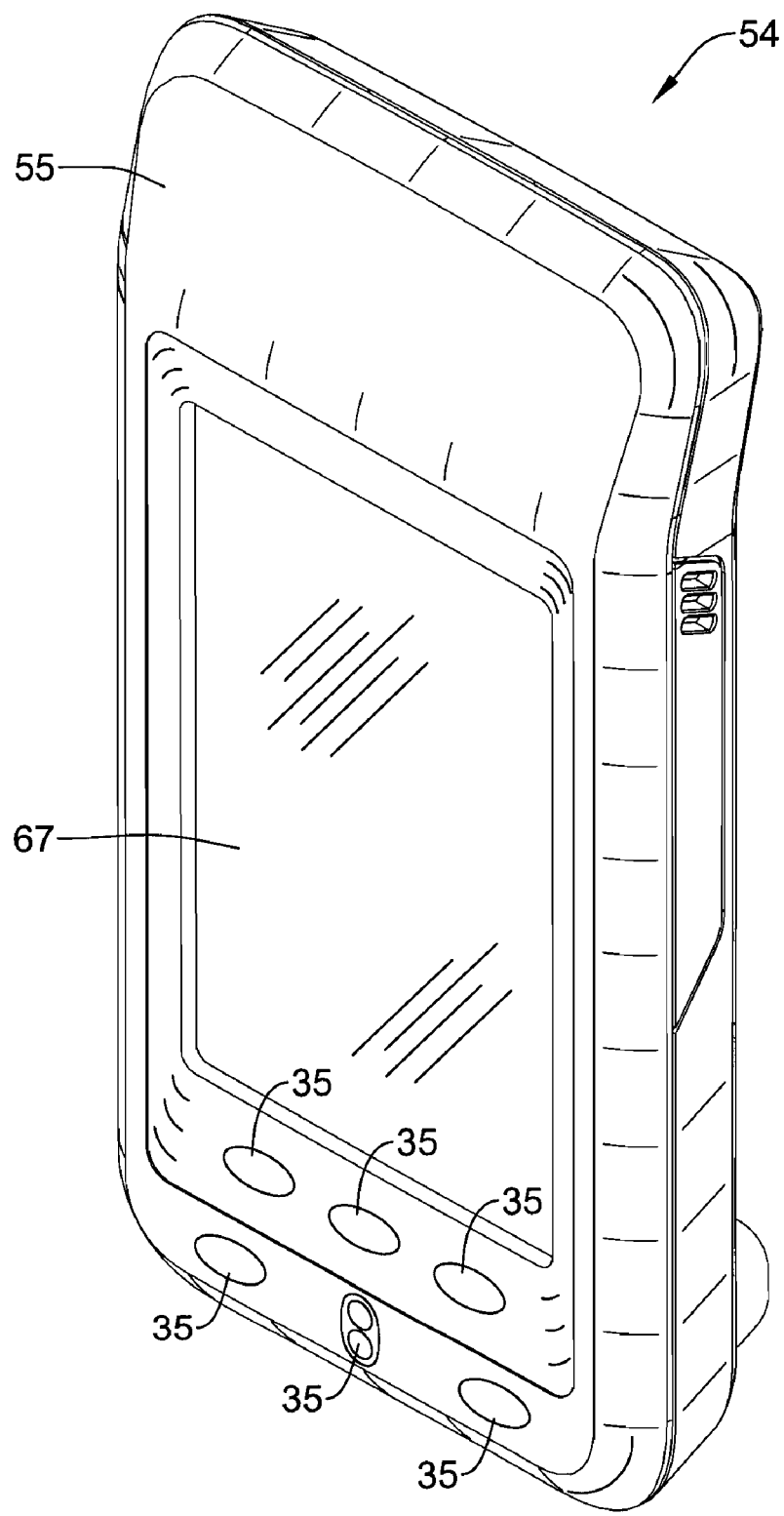
FIG. 1b shows a perspective view of an illustrative remote controller.

FIG. 1B is a perspective view of an illustrative HVAC remote controller 54. In some instances, HVAC remote controller 54 may represent a manifestation of HVAC remote controller 10 of FIGS. 1 and 1A, but this is not required. The illustrative HVAC remote controller 54 includes a display 67 that is disposed within a housing 55. In some cases, display 67 may be at least a portion of the user interface of the HVAC remote controller 54. Display 67 may be a non-touch screen display, a touch screen display, a liquid crystal display (LCD) panel, a dot matrix display, a fixed segment display, a cathode ray tube (CRT), or any other suitable display, as desired. A dot matrix display is a typically a LCD display that permits images such as letters, numbers, graphics, and the like to be displayed anywhere on the LCD, rather than being confined to predetermined locations such as is the case with a fixed segment LCD. Controller 54 may have buttons 35 as needed for operation, particularly in the non-touch screen version. Housing 55 may be formed of any suitable material, such as a polymeric, metallic, or any other material, as desired. In some cases, the display 67 may be either inset or recessed within the housing 55 as shown.

The HVAC remote controller 54 may be configured to provide substantial display and/or programming functionality. In some cases, the screens may include a home screen that can be displayed by HVAC remote controller 54 as a default screen, when no other data entry is underway, and/or when selected by the user. A home screen may, if desired, display one or more parameters relating to environmental conditions such as indoor and/or outdoor temperature and/or humidity, expected weather conditions, set points, time, equipment status, and/or any other suitable parameter or setting, as desired. In some cases, the home screen may vary depending on the HVAC system that the HVAC remote controller 54 is operatively engaged in helping to control (e.g., zone HVAC system, non-zoned HVAC system, programmable HVAC controller, non-programmable HVAC controller, and so forth).

In some instances, the home screen may allow many of the user settings of the HVAC remote controller 54 to be viewed and controlled, without having to access sub-menus. In one illustrative embodiment, all settings (other than installer setup settings) may be accessed and controlled in a single menu screen (e.g., the home screen). These settings may include, for example, system setting (e.g. heat, cool, off), set point(s), zone selection, clock, indoor temperature, outdoor temperature, and so forth It is contemplated that this may be accomplished even when the display 67 is a fixed segment LCD display. In some cases, less used settings, such as installer setup settings, may be provided in one or more sub-menus or other menus, if desired. In other embodiments, at least some of the settings for the main user functionality of the HVAC remote controller 54 may also be incorporated into one or more sub-menus, if desired.

In the illustrative example, HVAC remote controller 54 may be configured to display information about one or more HVAC control parameters on at least a portion of a screen display 67. In some cases, and as discussed herein, remote controller screen display 67, which may be at least part of the user interface, may include a screen display configured to display and/or allow a user to modify one or more parameters or settings. The parameters viewed and/or changes made using screen display 67 may be transmitted to and/or received from an HVAC controller 8.

Figure 1C:
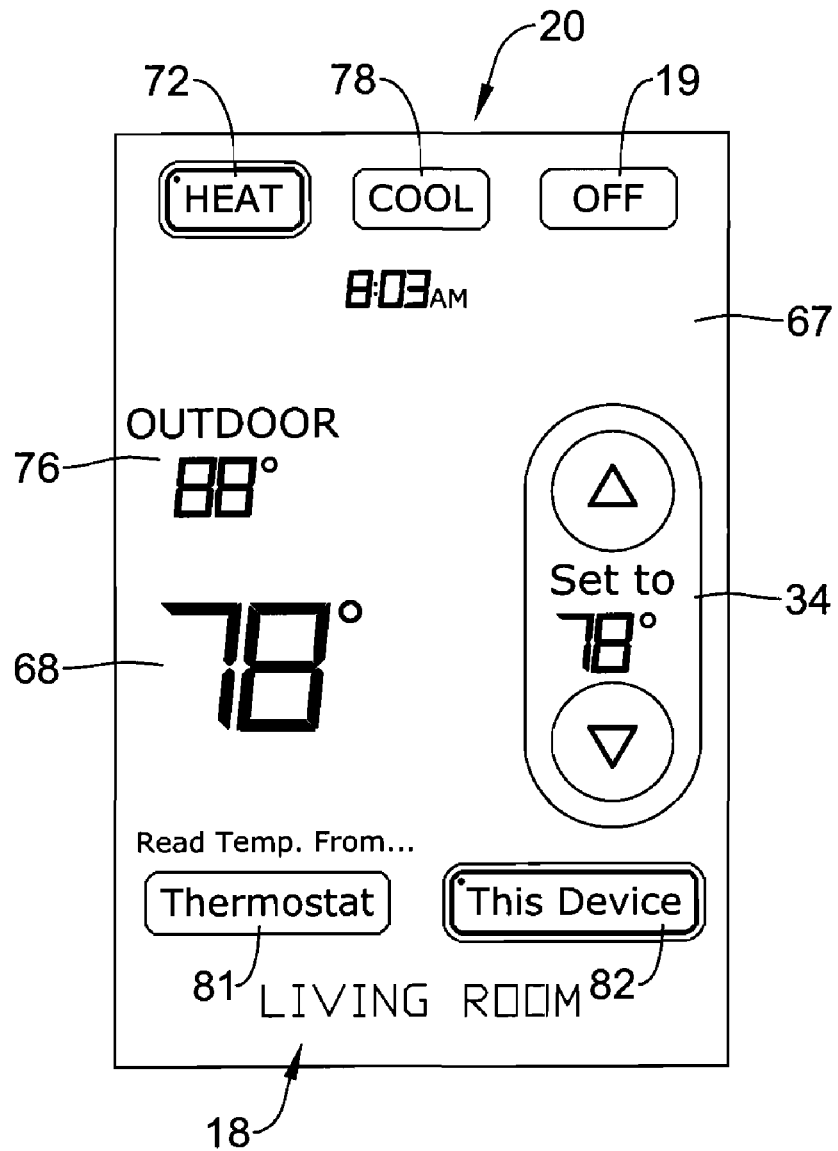
FIG. 1c is a diagram of a screen for a remote controller.

In FIG. 1C, the screen 20 may correspond to a home screen for the HVAC remote controller 54. In some cases, screen 20 may represent a home screen when, for example, the HVAC remote controller 54 is operatively coupled to a programmable HVAC controller 8 in a non-zoned HVAC system. As discussed previously, screen 20 of the screen display 67 may provide HVAC operational status, such as, the current inside temperature 68, the current outside temperature 76, the current time 74, and the current heat and/or cool set point 50. Also, screen 20 may indicate which device's temperature sensor is currently being used to control the comfort level within the building or other structure as indicated by the button or indicator 82 noted with a dark line around it and/or dot. If the temperature is from the thermostat, then button or indicator 81 may indicate such similarly with a dark line around it and/or dot. In addition, screen 20 may provide the operational status of the HVAC control system (e.g. heat, cool, off, and so forth). As illustrated, screen display 67 may include an icon 72 for indicating when the HVAC controller 8 is in heat mode, an icon 78 for indicating when the HVAC controller 8 is in cool mode, and an icon 19 for indicating when the HVAC controller 8 is in an off mode. As illustrated by the bold outline of icon 72 and the dot in icon 72, the operational status of the HVAC controller 8 is shown to be in the heat mode. In some cases, a user may be able to use the area of the screen display 67 corresponding to icon 72, 78, or 19 to manually switch the operational status of the HVAC controller 8, if desired.

In some cases, the HVAC remote controller 54 may be configured to detect a power level, such as, for example, a remaining battery power level. If the remaining battery power level detected by the HVAC remote controller 54 is less than a threshold level, in some cases, the screen display 67 may display low power and/or a "replace battery" label.

In the illustrative example, the HVAC remote controller may be configured to wirelessly communication with one or more HVAC controllers 8 and/or HVAC components 2. In some cases, it is contemplated that the wireless communication signal, such as, for example, a radio frequency (RF) signal, may be lost at least temporarily. In this case, when the communication signal is lost, the screen display 67 may indicate such.

Figure 1D:
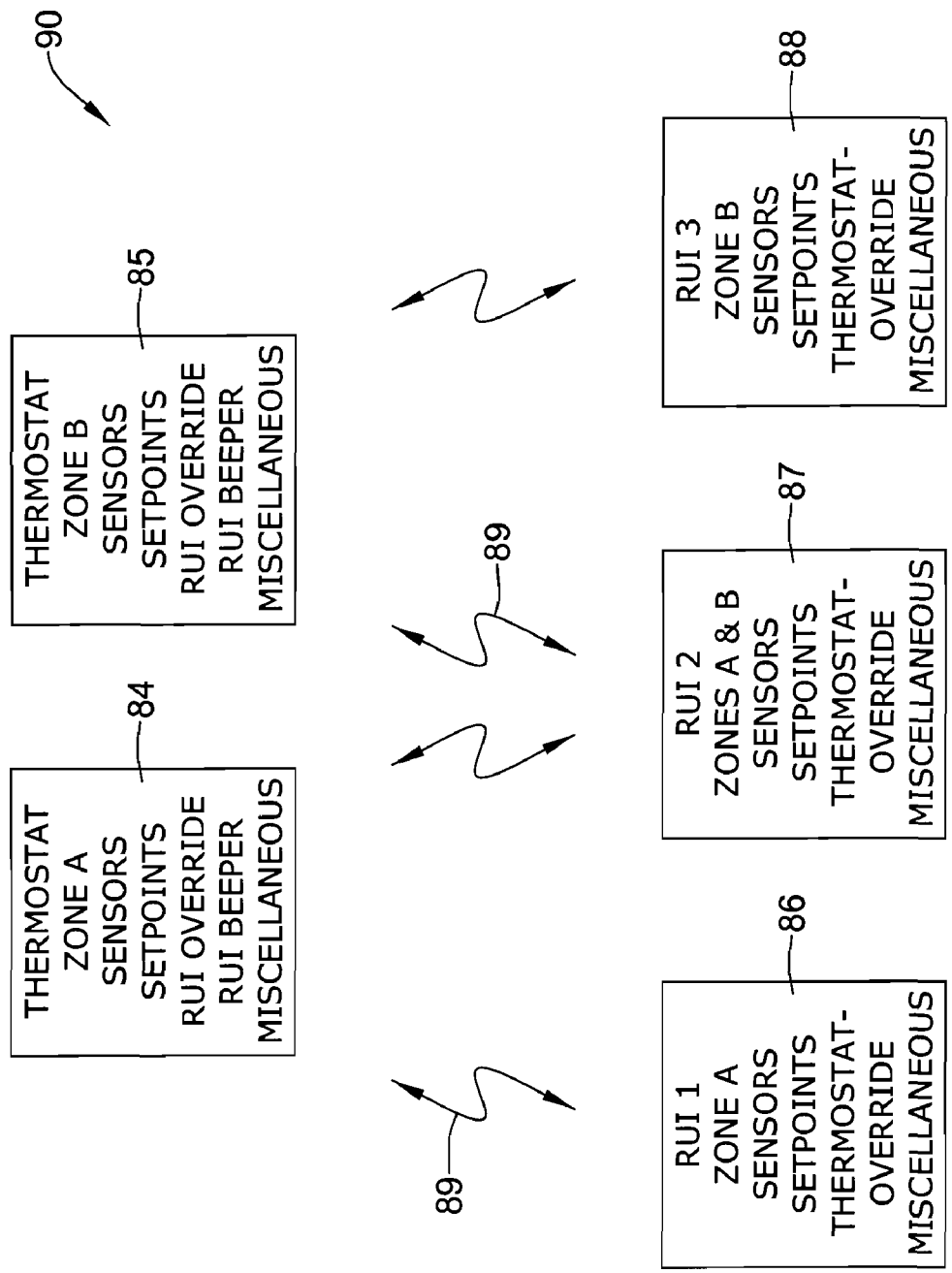
FIG. 1d is a diagram of an illustrative example of a thermostat/remote controller system.

FIG. 1D is an illustrative example of a thermostat/remote control system 90. It could be a single thermostat and single remote control or a multiple thermostat and multiple remote control system. Thermostats 84 and 85 may be for different zones A and B, respectively, or the same zone. In the latter case, the thermostats may be selective to different parts of a building or be backups for each other. There could be less or many more thermostats in the system 90. There may be one or more remote controls (RUIs) 86, 87 and 88 in system 90. They may be connection with their respective thermostats via a wireless medium 89. The connections could be another kind. Remote control 86 (RUI 1) may connect with thermostat 84 and remote control 88 (RUI 3) may connect with thermostat 85. Remote control 87 may connect with both thermostats 84 and 85. Remote control 87 (RUI 2) may select the thermostat (84 or 85) it is to control individually, or it may control them (84 and 85) simultaneously. Each thermostat of the system 90 may have a zone assignment, if applicable, sensors, setpoints, a remote control override, a beeper button for locating a remote control, and it may have other or miscellaneous items. Each remote control may have a zone assignment, if applicable, sensors, setpoints, a thermostat control override, and it may have other or miscellaneous items.

Figure 1E:
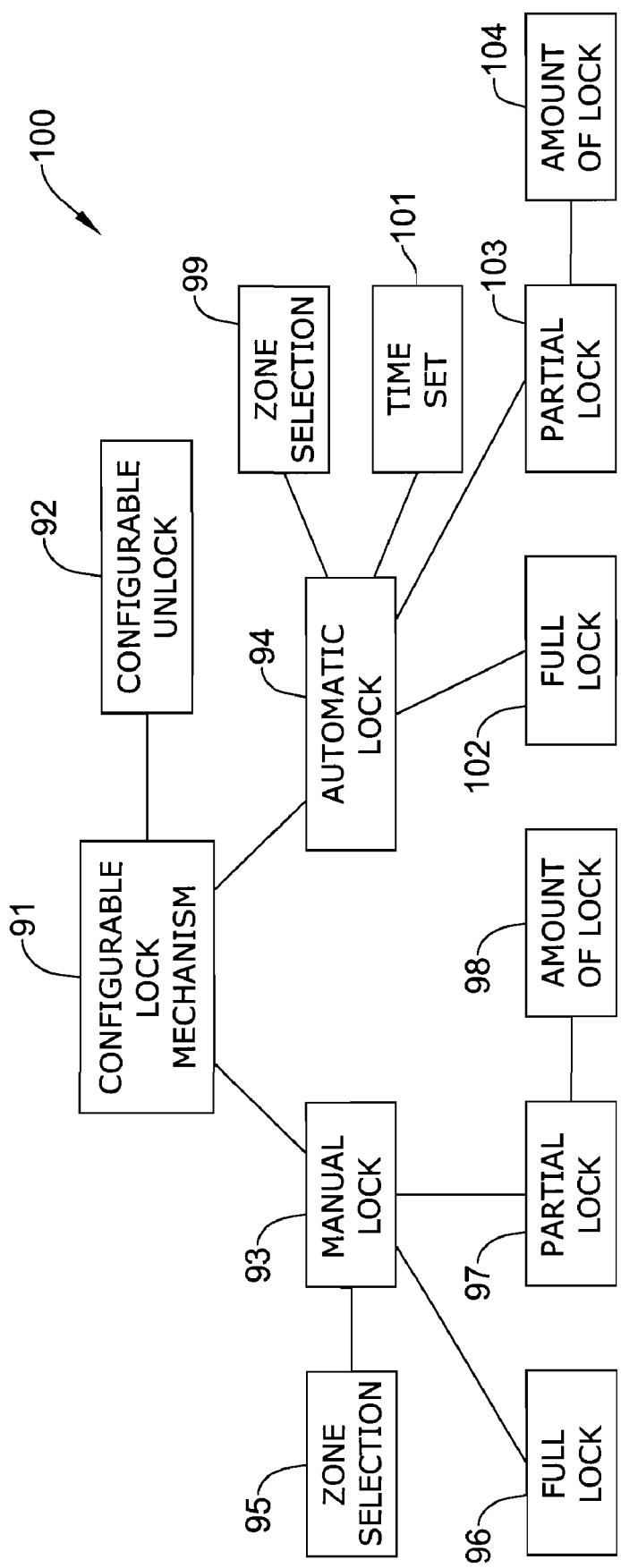
FIG. 1e is a diagram of an illustrative example of a configurable lock system.

FIG. 1E is a diagram of an illustrative example of a configurable lock system 100 of a remote control. It may include a configurable lock mechanism 91 having various components associated with it. An unlock component 92 may be configurable and connected to the mechanism 91. There may be a manual lock component 93 which may have a zone selection component 95, if applicable. In other words, if the remote control is designed to control several thermostats, one or more thermostats, for instance, may be individually selected for manual lock out. The manual lock may have a full lock component 96 and/or a partial lock component 97. The partial lock component 97 may have an amount of lock component 98 which bases a partial lock, which is configurable, on functionality, time, and/or other factors.

There may be an automatic lock component 94 of configurable lock mechanism 91 of system 100. The automatic lock component 94 may have a zone selection component 99, if applicable, along with a configurable time set 101 for effecting the lock a time after non-use of the remote control. The automatic lock 94 may have a full lock component 102 and/or a partial lock component 103. The partial lock component 103 may have an amount of lock component 104 which bases a partial lock, which is configurable, on functionality, time, and/or other factors.

Figure 2:
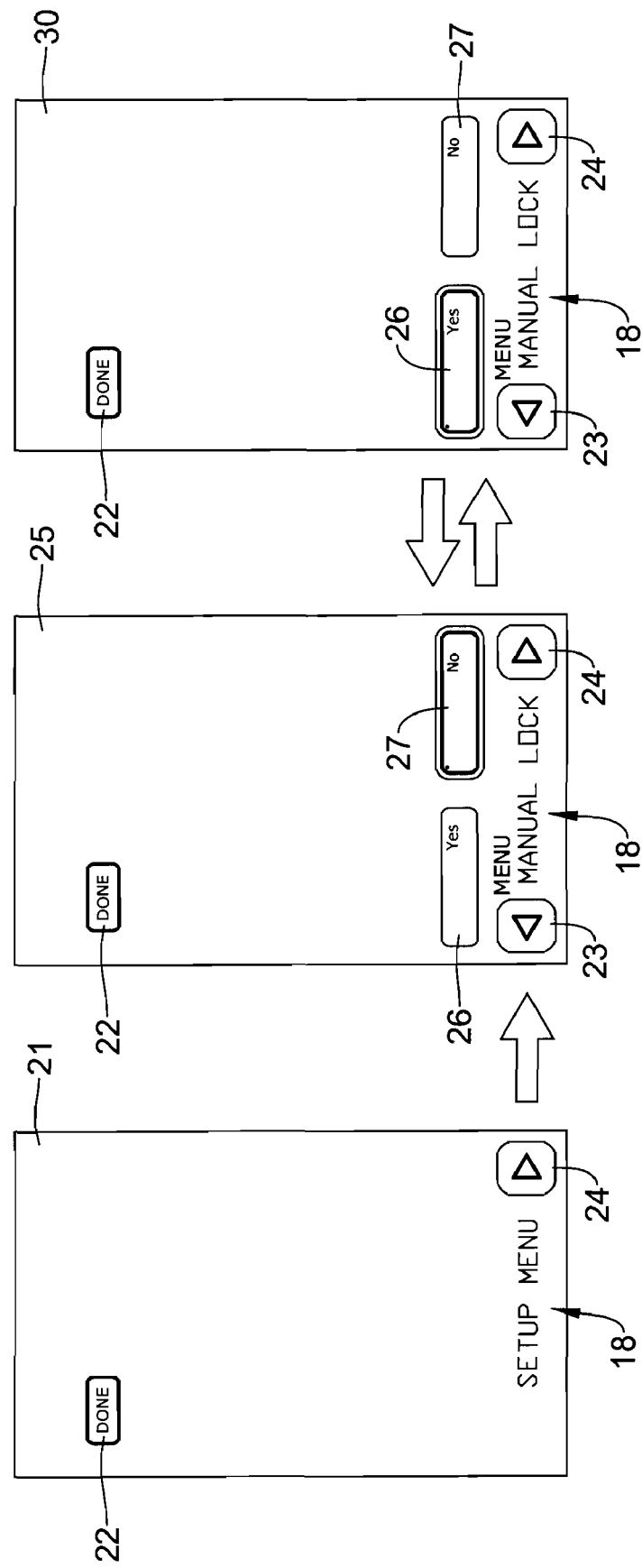
FIG. 2 is a diagram of a sequence of screens for configuring a manual lock.
Figure 3:
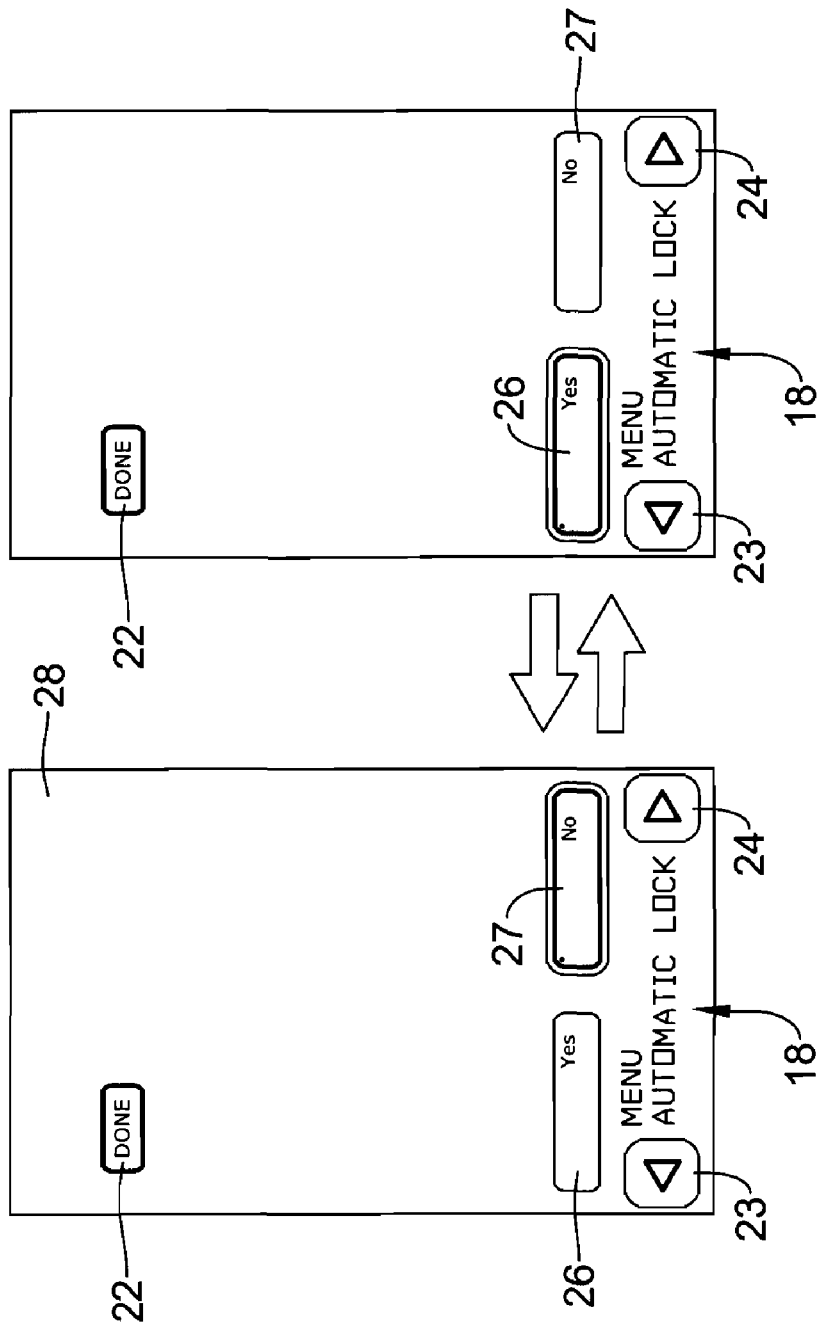
FIG. 3 is a diagram of a sequence of screens for configuring an automatic lock.

FIG. 2 shows a user setup screen 21 for the remote user interface or remote control. To enter the user setup, one may press an "off" area or button 19 on screen 20 of FIG. 1 for about three seconds to enter. The screen 21 of FIG. 2 may be an initial user setup screen used to teach the user how to navigate menu items. One may stop in any screen that has a "done" button 22 by pressing that button. Pressing the "done" button 22 may result in saving the changes and exiting. However, by pushing the right-directional arrow button 24 to advance a screen go to the "setup menu", as indicated in the message center 18 of the initial screen 21, one may go to a screen 25 in FIG. 2 having a menu for manual lock or go to a previous or another screen by pressing the left-directioned arrow button 23 to another screen. In screen 25, one may press a "yes" button 26 or a "no" button 27. Screen 25 shows the "no" button 27 pressed as indicated by an inside border line and dot on the button. This indication may be applicable to other buttons. From screen 25, if the "done" button 22 is not pressed, one may press the "no" button 27 to result in a screen 30 of FIG. 2 which shows a pressed "yes" button 26. Or from screen 25, one may press the arrow button 24 to advance from the manual lock menu screen 25 to an automatic lock menu screen 28 of FIG. 3, as indicated in message center 18. One may press the "no" button 27 as shown in screen 28 so as not to go to the automatic lock, or the "yes" button 26 in screen 29 in FIG. 3 to go to the automatic lock.

Figure 4A:
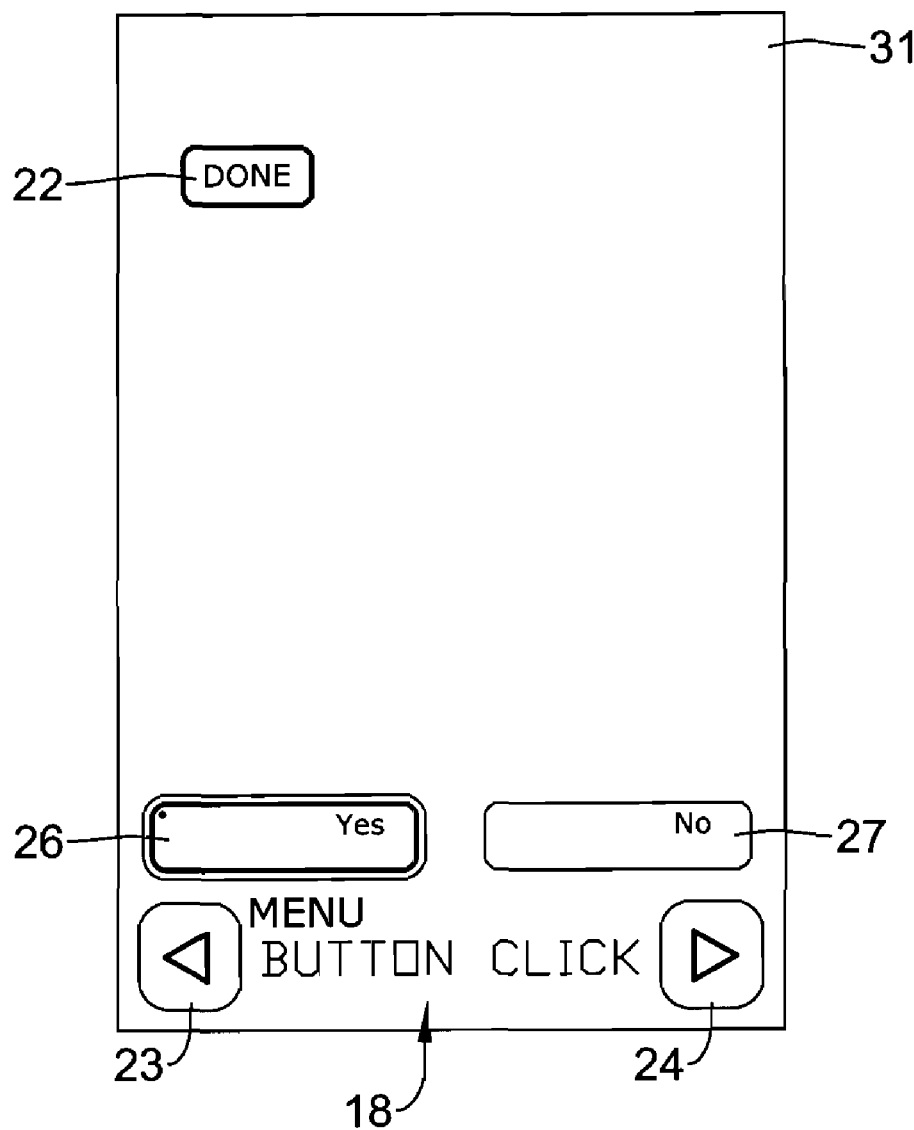
FIGS. 4a and 4b are diagrams of configuring button click screens.
Figure 4B:
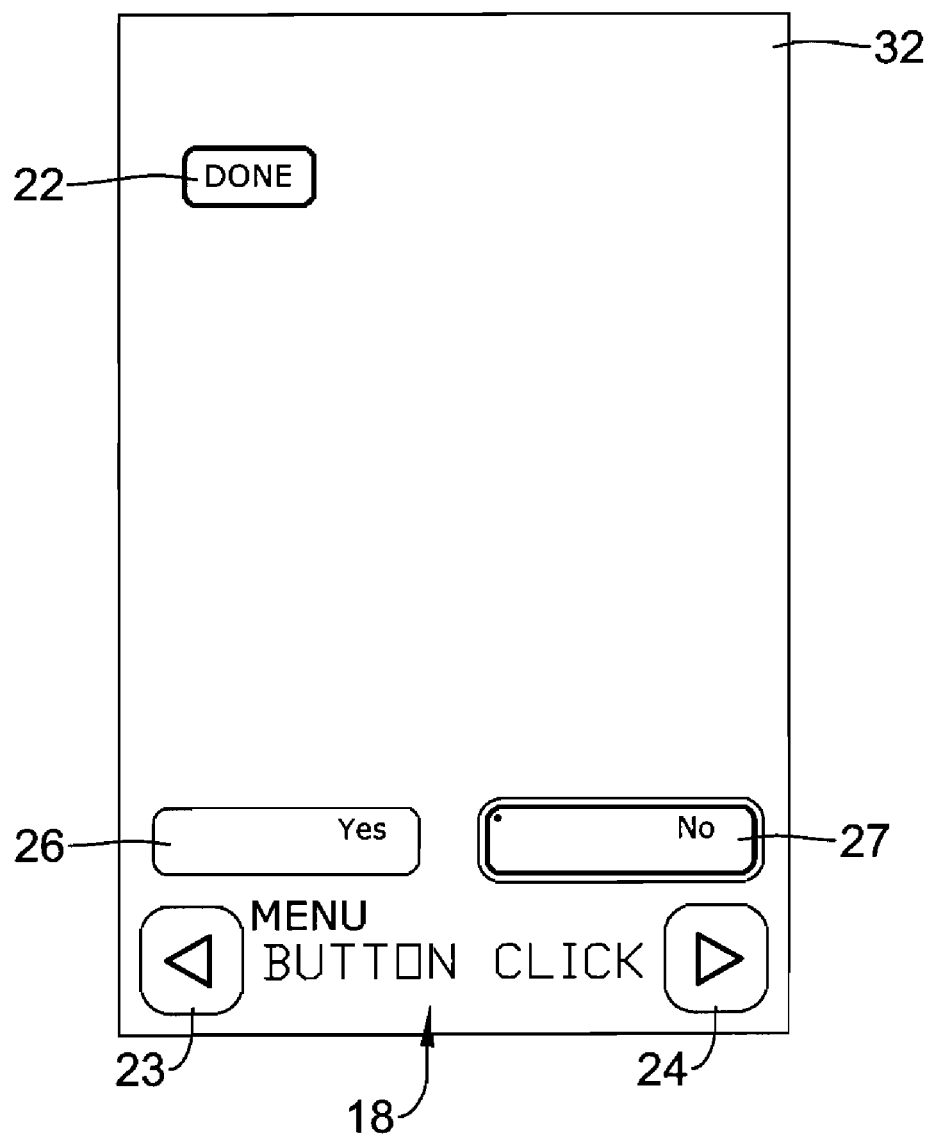
Figure 5:
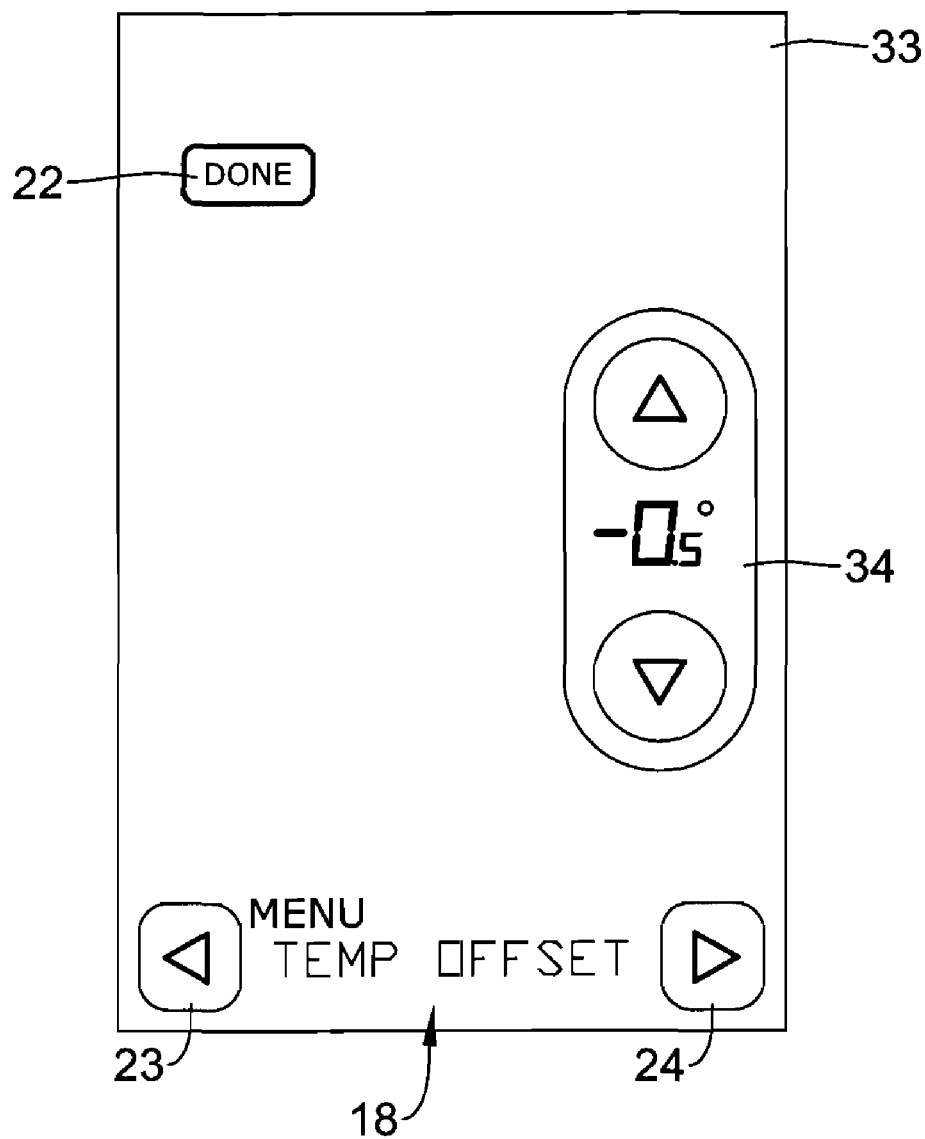
FIG. 5 is a diagram of a screen for configuring temperature offset.

One may advance from screen 30 with the "yes" button 26 pressed to screen 29 with the automatic lock menu by pressing the right-directional button 24. One may advance from screen 28 to a menu "button click" screen 31 of FIG. 4a or from screen 29 to the menu "button click" screen 32 of FIG. 4b. The menu "button click" screen 31 may have the "yes" button 26 pressed or have the "no" button 27 clicked to result in the screen 32. One may return to a previous screen such as screen 28 by pressing the left directioned button 23 or forward on to a next screen by pressing the right-directioned button 24. The next screen from either screen 31 or 32 may be a non-locked related menu temp offset screen 33 of FIG. 5. In screen 33, one may adjust temperature offset up or down with buttons 34 and offset display. After adjustment, if any, one may press the "done" button 22 to save changes and exit. Or one may go back a screen with pressing button 23 or eventually get to the initial menu screen with pressing button 24.

Figure 6A:
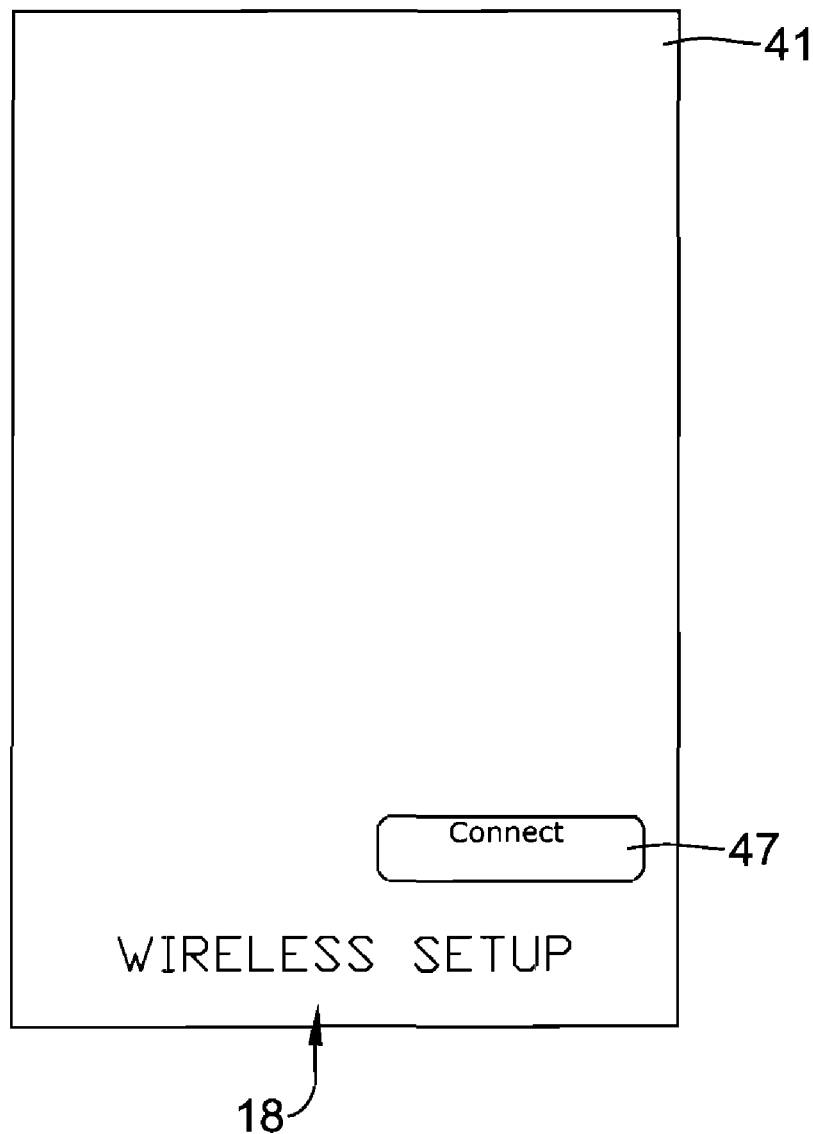
FIGS. 6a, 6b, 7a and 7b are diagrams of screens for a wireless setup and connection of a remote controller.
Figure 6B:
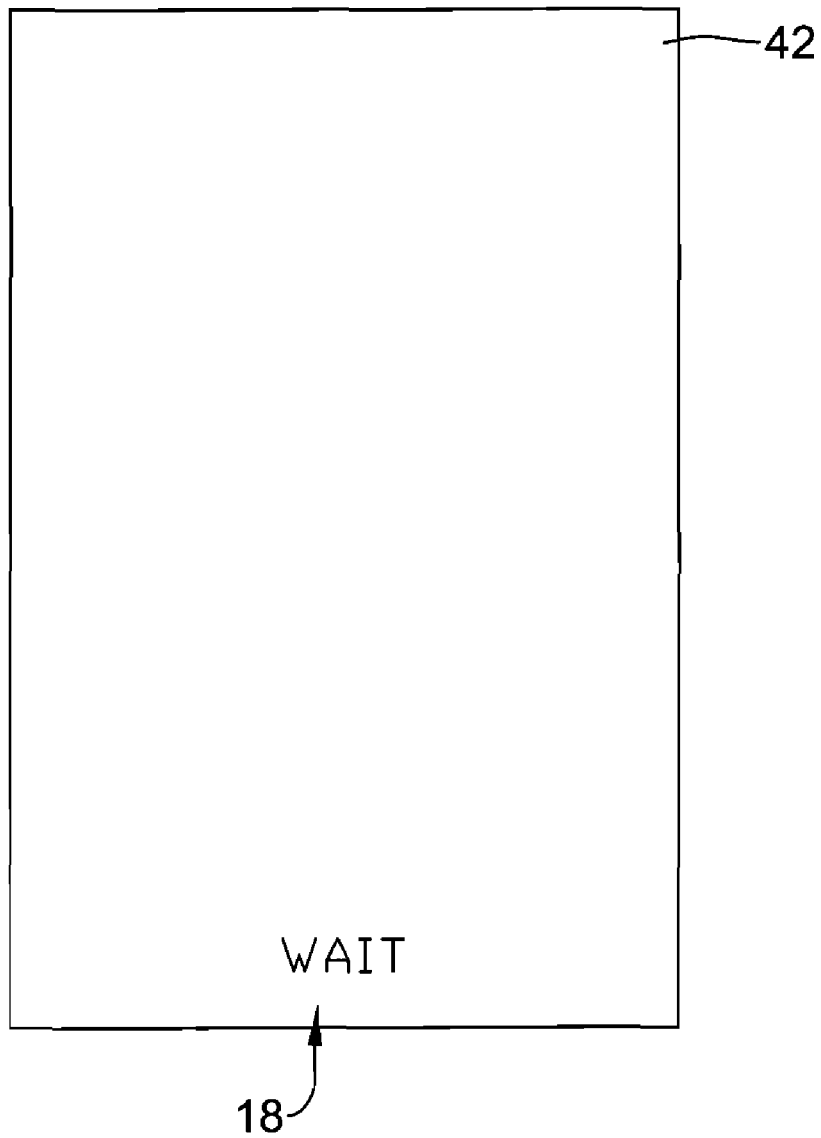
Figure 7A:
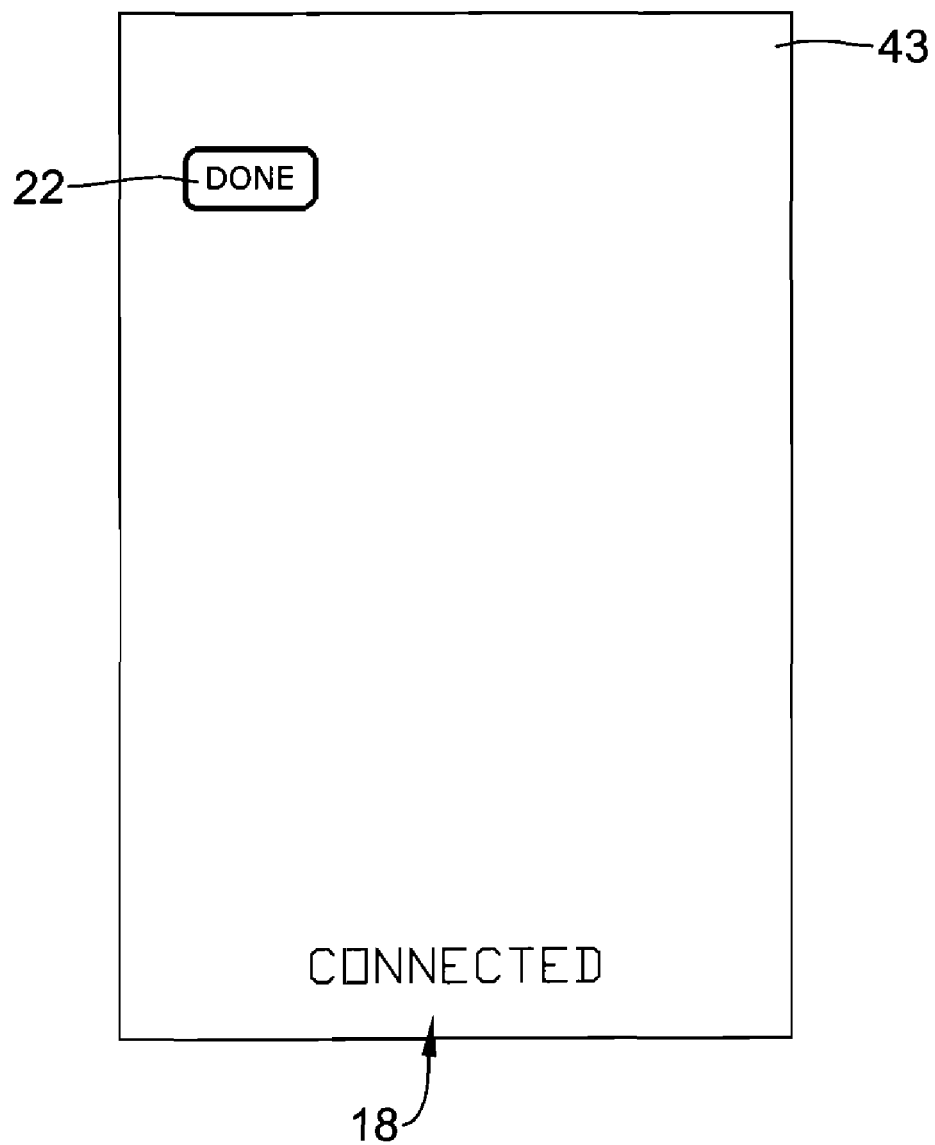
Figure 7B:
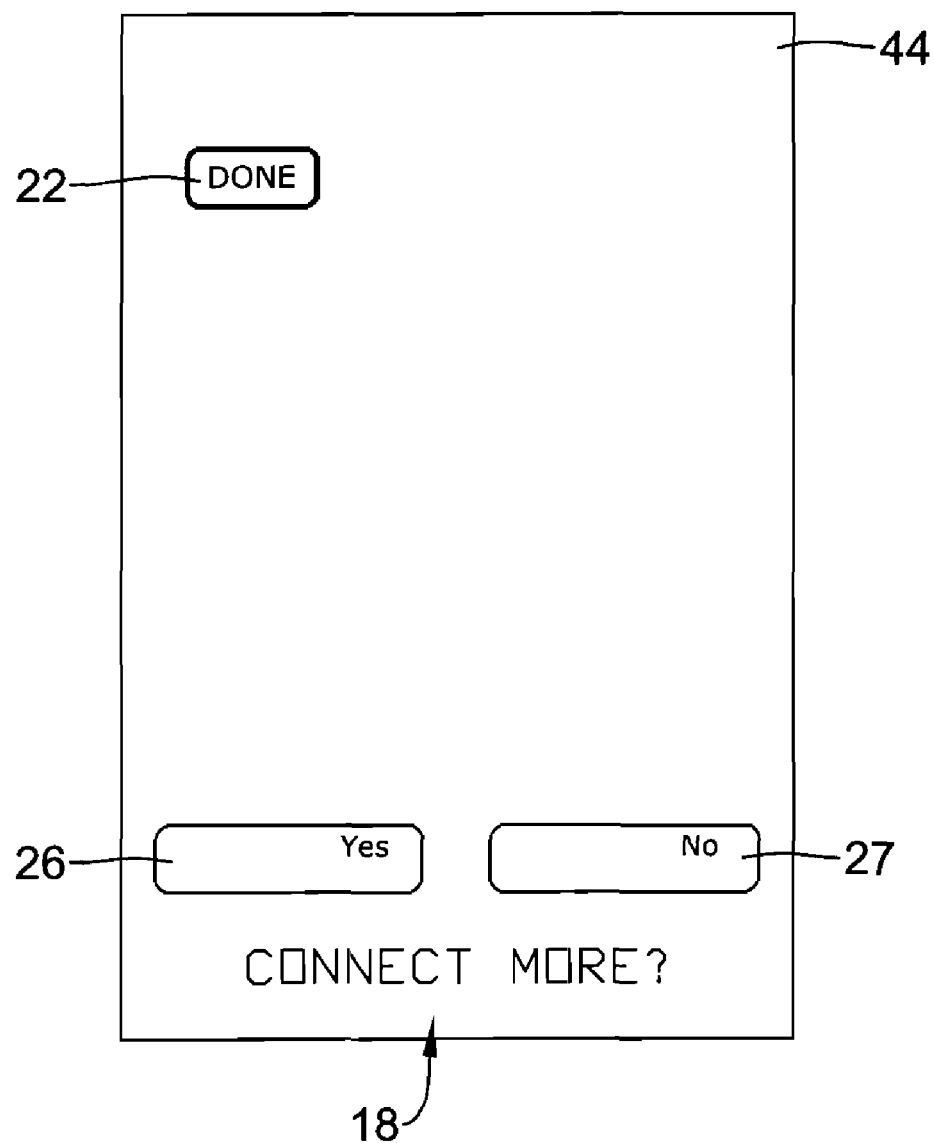
Figure 8A:
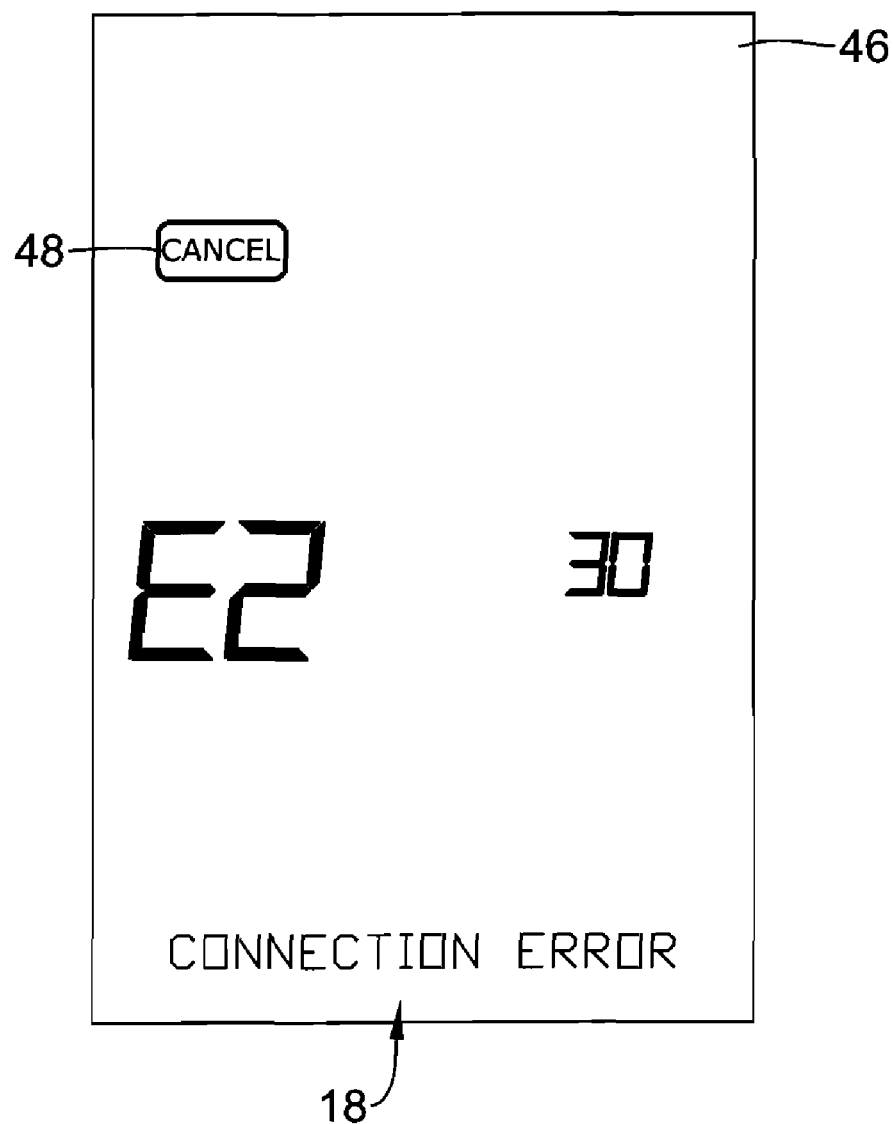
FIG. 8a is a diagram of an error screen.
Figure 8B:
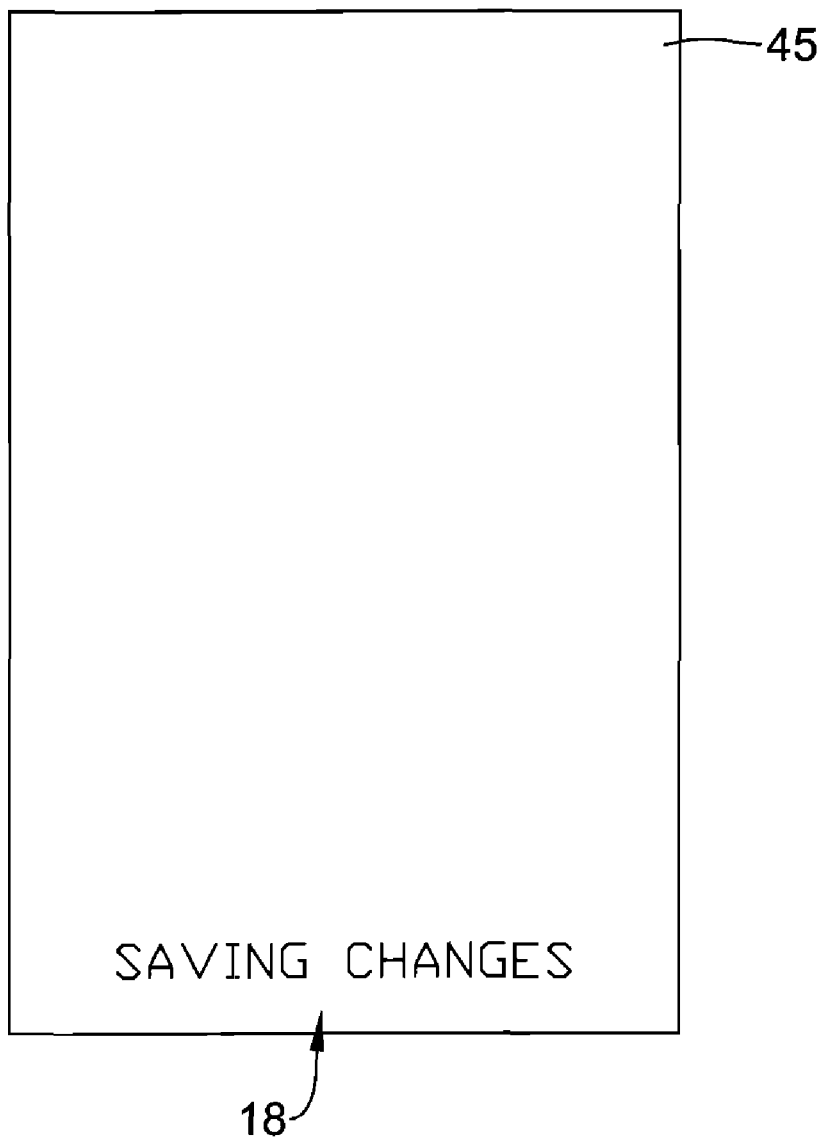
FIG. 8b is a diagram of a saving changes screen.
Figure 9:
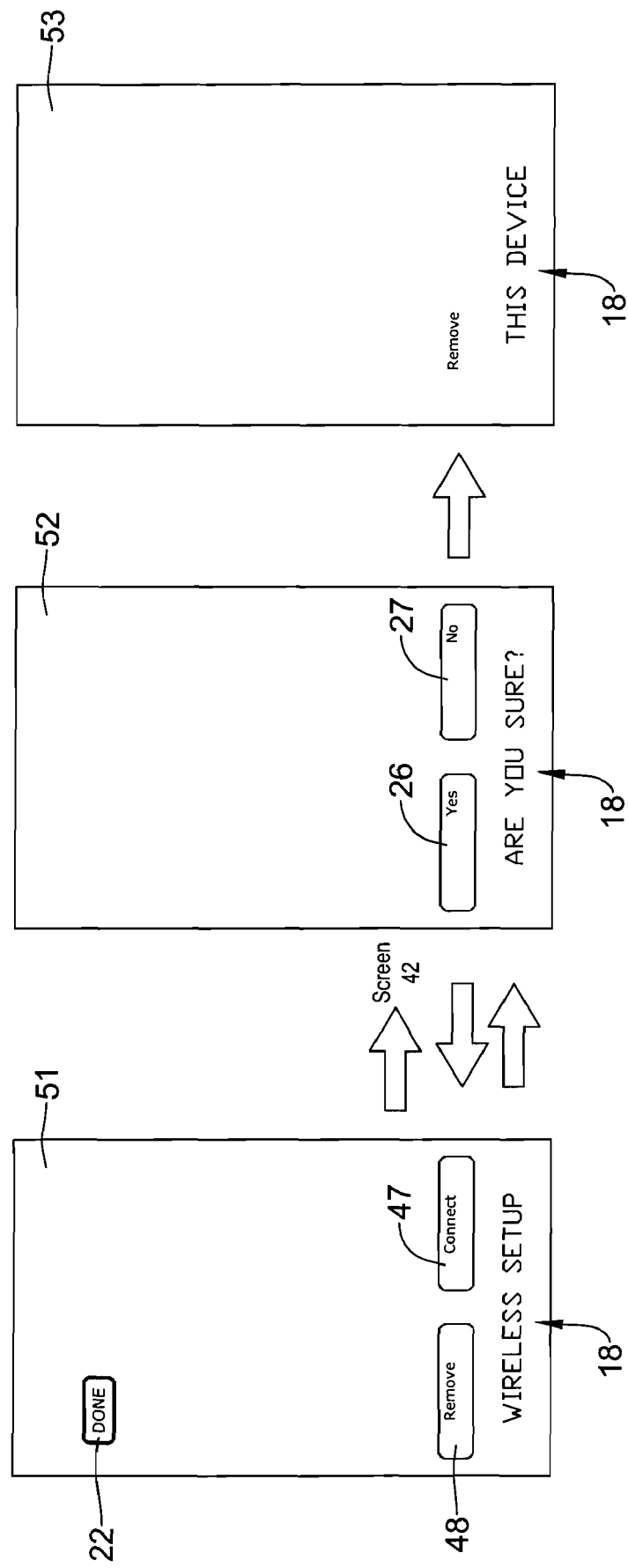
FIGS. 9a, 9b and 9c are diagrams of screens for a wireless connection or removal of a remote controller.
Figure 10A:
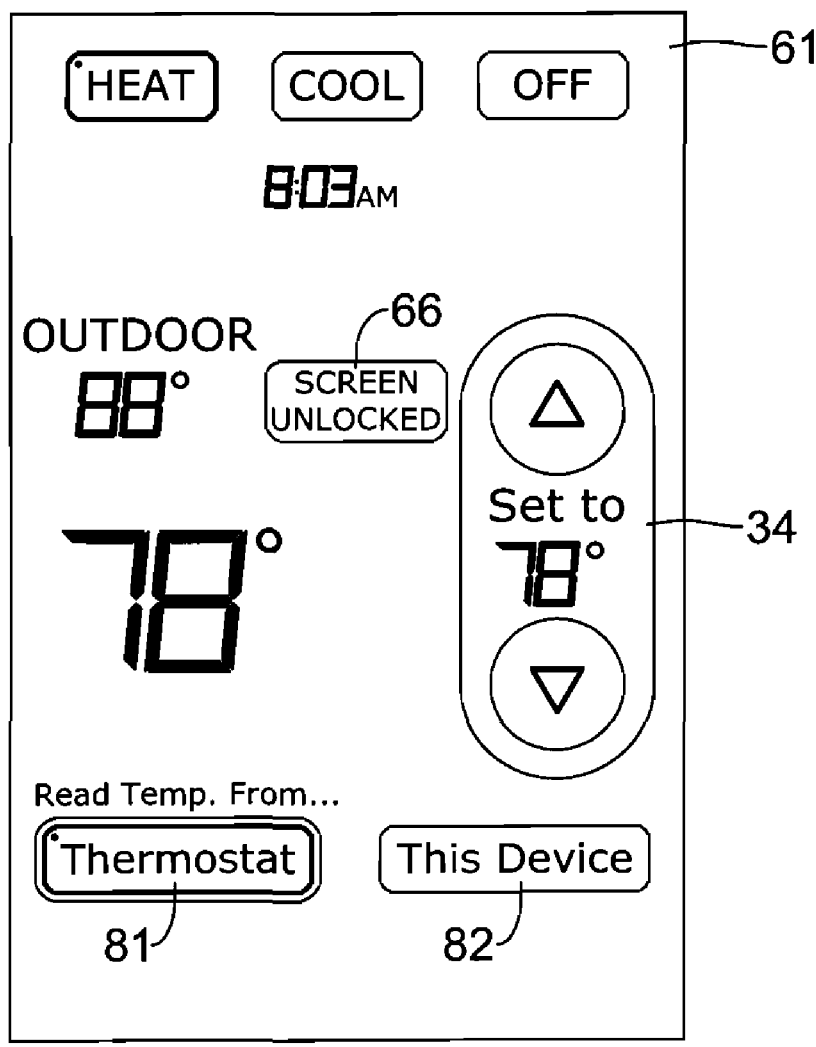
FIGS. 10a and 10b are diagrams of screens leading to a status of locked.
Figure 10B:
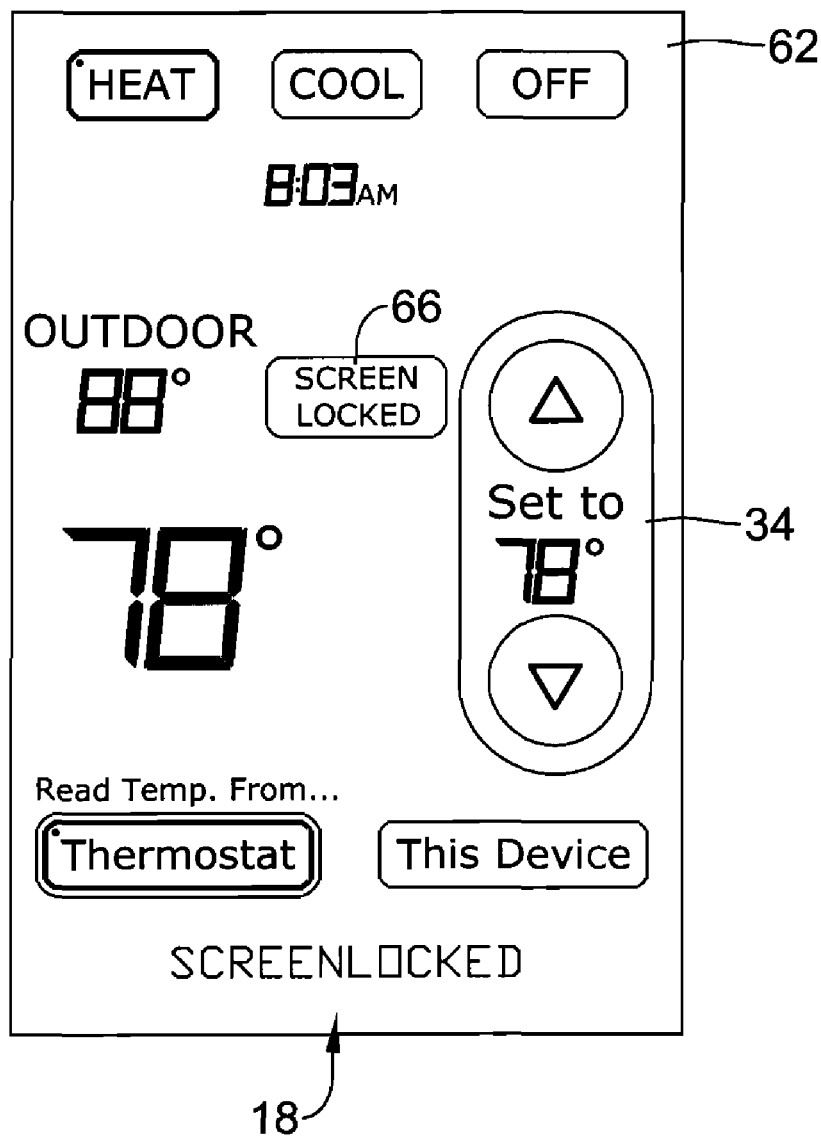
Figure 11A:
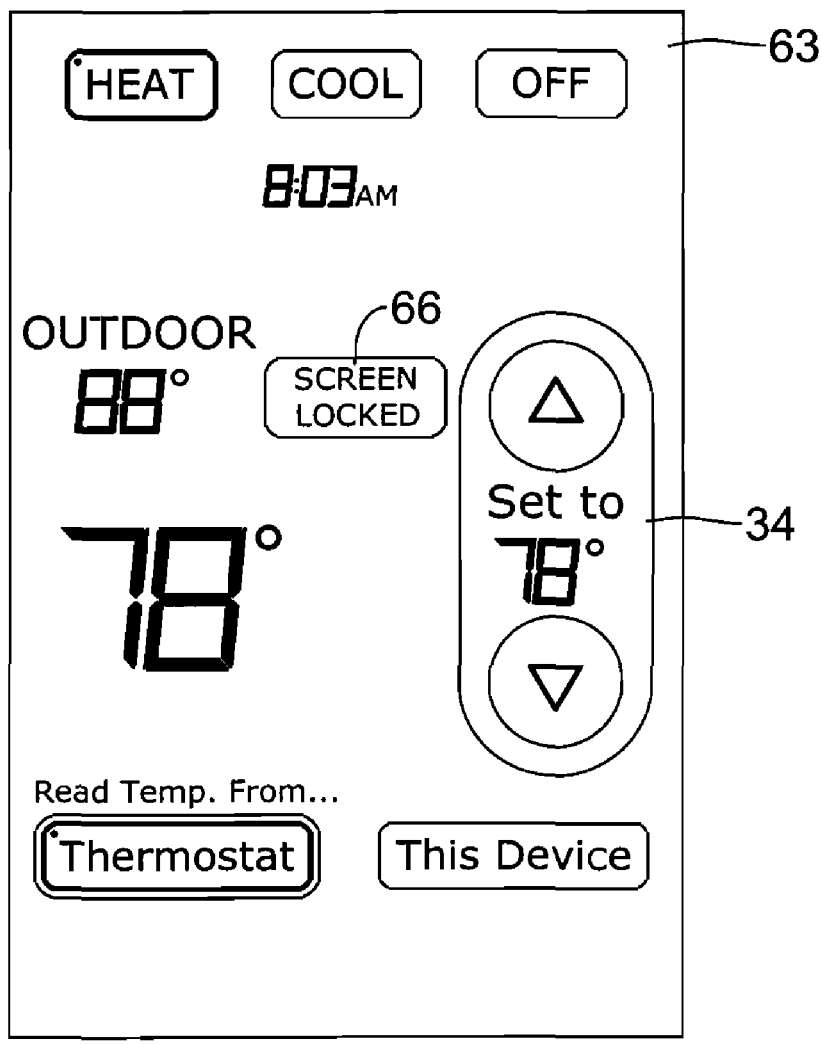
FIGS. 11a, 11b and 11c are diagrams of screens leading to a status of unlocked.
Figure 11B:
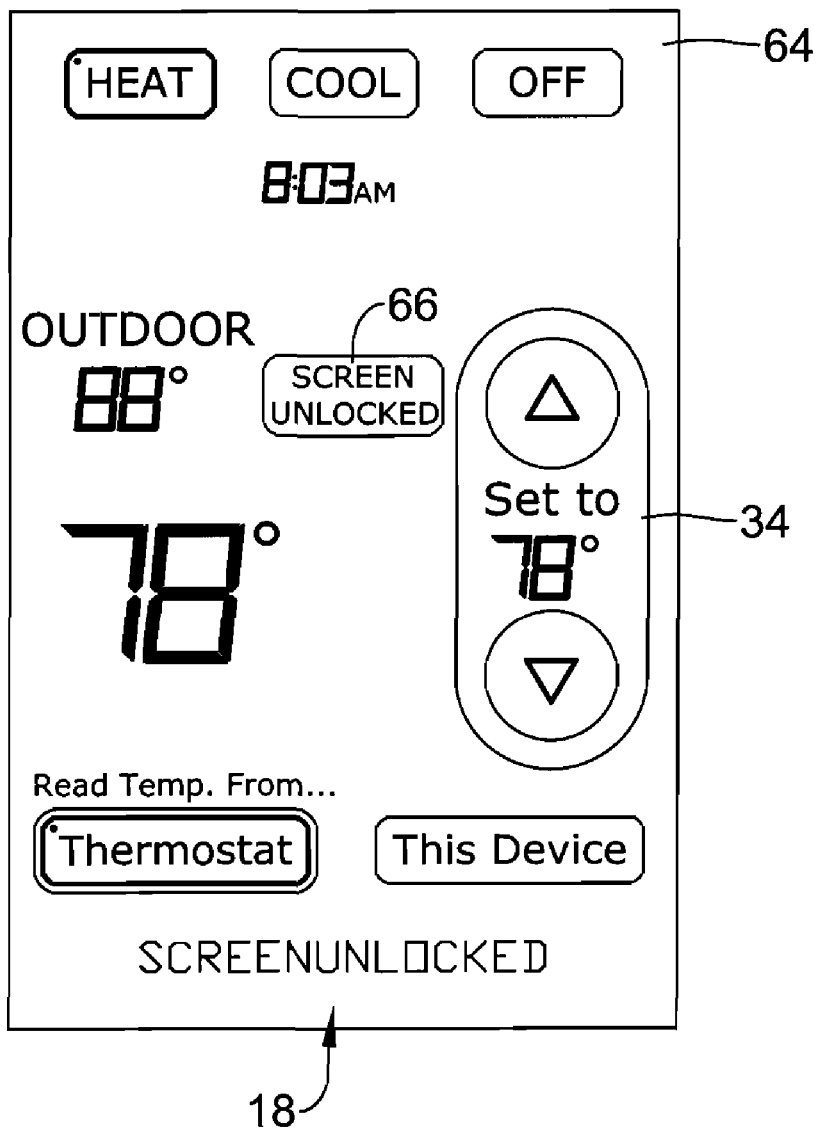
Figure 11C:
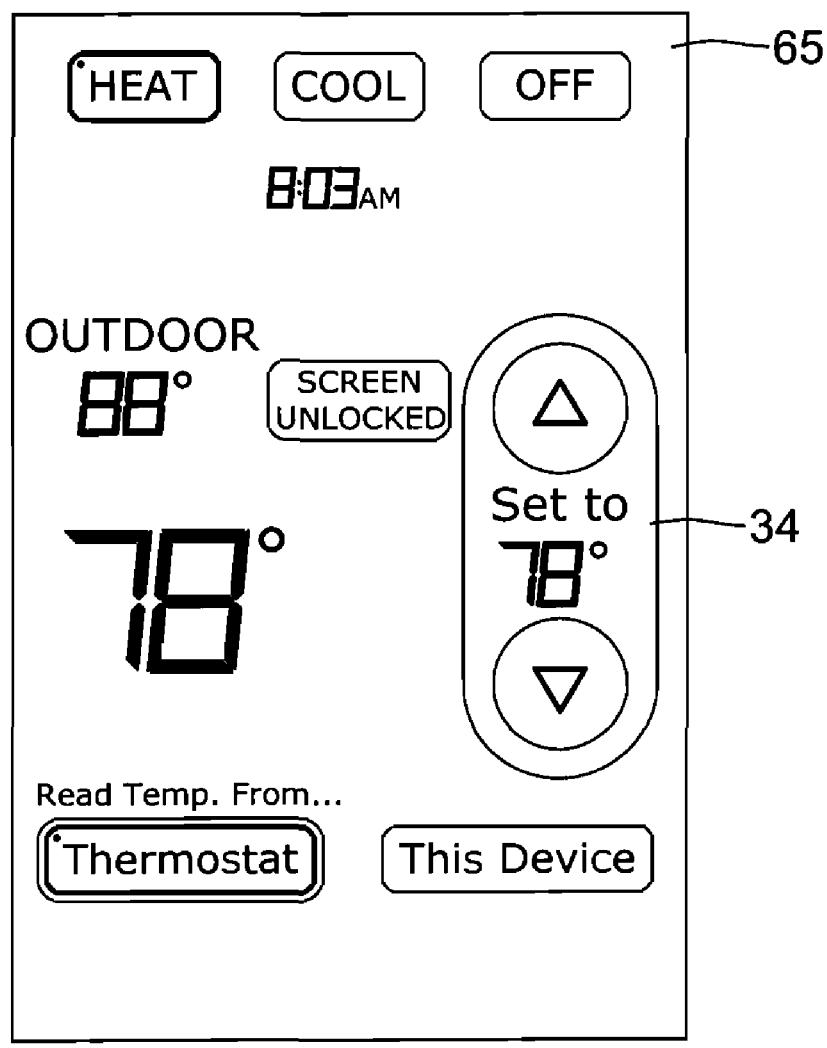

FIG. 6*a* shows an initial screen 41 for an out-of-the box setup for the remote control. It has a "connect" button 47 which may be pressed to connect the wireless setup, as indicated by message center 18 of screen 41. Upon pressing button 47, a connecting screen 42 of FIG. 6*b* may indicate "wait" in the message center 18. If the screen does not connect, then an error code screen 46 as in FIG. 8*a* may show indicating a connection error in message center 18 and code "E2". Pressing the "cancel" button 48 may return the screen back to one of the setup screens 21 and 51 of FIG. 2 or 9*a*, respectively. If the screen 42 does connect then one may get a screen 43 of FIG. 7*a*, which indicates "connected" in the message center 18. The "done" button 22 may be pressed to save changes and exit. One may get a "connect more?" screen 44 in FIG. 7*b*, which shows "yes" and "no" buttons 26 and 27, respectively. One may press button 26 to go to the installer screen 51 in FIG. 9*a* or may press button 27 of screen 44 to go to a "saving changes" screen 45 in FIG. 8*b*. Pressing the "done" button 22 in a previous screen, such as screen 43, may get one to screen 45. At screen 45, there may be about a four second or so timeout and then one may go to the initial home screen 41.

By pressing setpoint up and down buttons 34 of, for instance screen 33, for about three seconds, one may get the installer setup screen 51 with a "wireless setup" indication at range 18. Pressing the "connect" button 47 may take one to the connecting screen 42. Pressing the done button 22 would be to exit the screen 51. Pressing a remove button 48 may take one to a verify screen 52 of FIG. 9*b* which asks "are you sure"? If one presses the "no" button 27, then screen 51 may return. If one presses the "yes" button 26, then a confirm screen 53 of FIG. 9*c* appears which indicates "remove this device". There may be about a five second timeout and then one may go to the initial out-of-box screen 41.

FIGS. 10*a*, 10*b*, 11*a*, 11*b* and 11*c* show screens 61, 62, 63, 64 and 65, respectively, for screen lock navigation. A screen lock button 66 may be provided in these screens. One may press the screen lock button 66 for about three seconds, or some other prescribed length of time, to enter and exit the lock mode. The screens 61 and 64 show the "screen unlocked" or "screen locked" in the message center 18 after the button 66 has been held for the three or so seconds. The message center 18 may revert back to a blank as shown in screens 63 and 65 upon the button 66 release (manual mode). A time-out after 30 seconds from screen 61 may result in an auto screen lock mode at screen 63 which is indicated at button 66. A zoned screen 62 and 64, for example, generally will not show left and right arrow buttons 23 and 24 (see FIGS. 10 and 11) which the screen locked and locked is shown at message center 18, respectively. The screen lock button 66 may flash for all button presses except for the screen locked. The flash rate may be about one-half second on and about one-half second off with a flash duration of three seconds. To go to manual or auto mode, one may press and hold the keylock button 66 for about three seconds. Holding the button 66 in screen 63 for about three seconds will result in the screen unlocked with the message center 18 showing "screen unlocked" in screen 64. Releasing the button 66 in screen 64 will result in a manual mode in screen 65. The times and rates stated herein are illustrative examples but may have other magnitudes or values.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A thermostat system comprising:
a thermostat module; and
a portable remote user interface unit having a connection to the thermostat module; and
wherein the portable remote user interface unit comprises a lock control mechanism for locking out control of the portable remote user interface unit by a user; and
wherein the lock control mechanism comprises a first partial lock which is manual; and a second partial lock which is automatic; and wherein a portion of the first partial lock which is manual for a set period of time and then becomes automatic.

2. The system of claim 1, wherein:
the lock control mechanism is selectively configurable configured for between manual and automatic lock;
if the lock control mechanism is configured for manual lock, then the portable remote user interface unit is manually locked for locking out control of the portable remote user interface; and
if the lock control mechanism is configured for automatic lock, then control of the portable remote user interface unit is automatically locked out after a configured period of time from a last operation on the portable remote user interface unit.

3. The system of claim 1, wherein the portable remote user interface unit further comprises:
a parameter sensor; and
a sensor parameter control mechanism.

4. The system of claim 3, wherein:
a partial lock of the portable remote user interface unit locks out the parameter sensor, the sensor parameter control mechanism, or another portion of the portable remote user interface unit.

5. The system of claim 3, wherein:
the thermostat module comprises an override control mechanism which is selectively configurable for either partially or completely overriding the portable remote user interface unit; and
if the override control mechanism control is configured for partially overriding the portable remote user interface unit, then partially overriding the portable remote user interface unit comprises either disconnecting the parameter sensor at the portable remote user interface unit, the sensor parameter control mechanism at the portable remote user interface unit, or another portion of the portable remote user interface unit.

6. The system of claim 1, wherein the thermostat module comprises a beeper mechanism for sounding a beeper in the portable remote user interface unit.

7. The system of claim 4, wherein:
- both the full lock and the partial lock of the portable remote user interface unit are terminated with a coded entry at the portable remote user interface unit or the thermostat module; and
- the portable remote user interface unit visually reveals its full lock or partial lock status.

8. The system of claim 7, wherein to remove either of the full lock or partial lock of the portable remote user interface unit, an uncoded entry to either of the portable remote user interface unit or the thermostat module is maintained for a specified period of time to remove the full lock or partial lock.

9. The system of claim 1, wherein the portable remote user interface unit comprises an override control mechanism that is configurable for overriding a certain portion or all of the functionality of the thermostat module.

10. The system of claim 7, wherein the lock control mechanism comprises an approach for coded entry recovery and/or change.

11. The system of claim 1, wherein the lock control mechanism is configurable for providing a full lock of the portable remote user interface unit.

12. A thermostatic control system comprising:
- a thermostat;
- one or more remote control units connected to the thermostat; and
- wherein each of the one or more remote control units comprises a lock-out mechanism for disabling the respective remote control unit; and
- wherein the lock-out mechanism can be configured at both the thermostat and the one or more remote control units.

13. The system of claim 12, wherein each of the one or more remote control units is assigned to a temperature control zone.

14. The system of claim 13, wherein each of the one or more remote control units has a manual lock-out or an automatic lock-out mechanism that locks out the remote control unit after a last active action on the remote control unit.

15. The system of claim 12, wherein each of the remote control units has a beeper which can be individually activated at the thermostat.

16. The system of claim 12, wherein each of the one or more remote control units comprises:
- a parameter sensor;
- a parameter control unit; and
- wherein the lock-out mechanism disconnects the parameter sensor and/or the parameter control unit.

17. The system of claim 16, wherein if the lock-out mechanism is inactivated at the remote control unit or the thermostat, then the parameter sensor and the parameter control unit are reconnected.

18. A keylock system of a thermostat remote controller comprising:
- a thermostat connected to a building air temperature control system; and
- a remote controller connected to the thermostat and having a configurable lock-out mechanism; and
- wherein the lock-out mechanism can be configured alternatively at either of both the thermostat and the remote controller, relative to:
  - electing between manual and automatic lock-out,
  - setting an amount of partial lockout, and
  - setting an amount of time before an automatic lockout occurs after usage of the remote controller.

19. The system of claim 18, wherein the lockout mechanism is configurable as to an amount of time for locking out the remote controller from a user after a last usage of the remote controller.

\* \* \* \* \*